United States Patent
Tomlinson

(10) Patent No.: US 9,546,313 B2
(45) Date of Patent: Jan. 17, 2017

(54) COMPOSITIONS AND METHODS FOR CONTROLLING WELLSITE FLUID AND GAS FLOW

(71) Applicant: Brian Henry Tomlinson, Baku (AZ)

(72) Inventor: Brian Henry Tomlinson, Baku (AZ)

(*) Notice: Subject to any disclaimer, the term of this patent is extended or adjusted under 35 U.S.C. 154(b) by 235 days.

(21) Appl. No.: 14/106,336

(22) Filed: Dec. 13, 2013

(65) Prior Publication Data
US 2015/0166873 A1    Jun. 18, 2015

(51) Int. Cl.
E21B 33/13    (2006.01)
C09K 8/46    (2006.01)
C04B 28/30    (2006.01)
C09K 8/48    (2006.01)
C09K 8/487    (2006.01)

(52) U.S. Cl.
CPC ............... *C09K 8/46* (2013.01); *C04B 28/30* (2013.01); *C09K 8/48* (2013.01); *C09K 8/487* (2013.01); *E21B 33/13* (2013.01)

(58) Field of Classification Search
CPC ........... C09K 8/46; E21B 33/13; E21B 33/14; E21B 33/146
See application file for complete search history.

(56) References Cited

U.S. PATENT DOCUMENTS

| | | |
|---|---|---|
| 1,019,083 A | 3/1912 | Pink et al. |
| 1,634,505 A | 7/1927 | McCaughey |
| 2,351,641 A | 6/1944 | Sohl et al. |
| 2,543,959 A | 3/1951 | Eastin |
| 2,818,119 A | 12/1957 | Huber et al. |
| 2,939,799 A | 6/1960 | Chisholm |
| 3,320,077 A | 5/1967 | Prior |
| 3,379,252 A | 4/1968 | Heckler et al. |
| 3,816,148 A | 6/1974 | Barthel |
| 3,887,009 A | 6/1975 | Miller et al. |
| 3,951,885 A | 4/1976 | Thompson |

(Continued)

FOREIGN PATENT DOCUMENTS

| | | |
|---|---|---|
| EA | 008274 B1 | 4/2007 |
| EP | 0558232 A1 | 9/1993 |

(Continued)

OTHER PUBLICATIONS

Baymag Material Safety Data Sheet, Baymag Inc., Calgary, Alberta, Canada, Date: Jan. 21, 2013.

(Continued)

*Primary Examiner* — Catherine Loikith
*Assistant Examiner* — Ryan Schneer
(74) *Attorney, Agent, or Firm* — Jansson Munger McKinley & Kirby Ltd.

(57) ABSTRACT

Magnesium oxysulfate cement compositions and methods for controlling and preventing fluid and gas flow through a wellbore are described. The compositions and methods may be implemented to provide a barrier to fluid and gas flow between casings or in other operations such as squeeze operations. Magnesium oxysulfate cement compositions may include an admixture of magnesium oxide, magnesium sulfate trihydrate and water. When admixed with water, the compositions rapidly transition from a flowable state to a solid state with formation of little or no gel strength before the transition and further have a near-linear relationship between the time required for the transition to occur and the composition temperature at which the transition occurs enabling the user to determine the time within which the transition will occur. Additives, such as accelerators and inhibitors can be added to modify the time in which the compositions make the transition from flowable state to solid state. Other agents can be added to modify the specific gravity and viscosity of the compositions.

19 Claims, 18 Drawing Sheets

(56) References Cited

U.S. PATENT DOCUMENTS

| | | | |
|---|---|---|---|
| 3,963,849 | A | 6/1976 | Thompson |
| 4,158,388 | A | 6/1979 | Owen et al. |
| 4,158,570 | A | 6/1979 | Irwin |
| 4,209,339 | A | 6/1980 | Smith-Johannsen |
| 4,352,694 | A | 10/1982 | Smith-Johannsen |
| 4,407,369 | A * | 10/1983 | Hutchison ............... E21B 33/12 166/185 |
| 4,480,693 | A | 11/1984 | Newlove et al. |
| 4,886,550 | A | 12/1989 | Alexander |
| 5,004,505 | A | 4/1991 | Alley et al. |
| 5,039,454 | A | 8/1991 | Policastro et al. |
| 5,110,361 | A | 5/1992 | Alley et al. |
| 5,213,161 | A | 5/1993 | King et al. |
| 5,220,960 | A | 6/1993 | Totten et al. |
| 5,228,524 | A | 7/1993 | Johnson et al. |
| 5,281,270 | A | 1/1994 | Totten et al. |
| 5,298,069 | A | 3/1994 | King et al. |
| 5,504,062 | A | 4/1996 | Johnson |
| 6,664,215 | B1 | 12/2003 | Tomlinson |
| 7,044,222 | B2 | 5/2006 | Tomlinson |
| 7,290,611 | B2 * | 11/2007 | Badalamenti ........... E21B 33/02 166/177.4 |
| 7,441,599 | B2 * | 10/2008 | Hermes .................... C09K 8/42 166/288 |
| 2006/0086503 | A1 | 4/2006 | Reddy et al. |

FOREIGN PATENT DOCUMENTS

| | | |
|---|---|---|
| EP | 0582367 A1 | 2/1994 |
| NO | 324366 B1 | 10/2007 |
| RU | 2015155 C1 | 6/1994 |
| RU | 2060360 C1 | 5/1996 |
| WO | 0193842 A2 | 12/2001 |

OTHER PUBLICATIONS

Baymag Magnesium Oxide Industrial Applications, <http://www.baymag.com/applications/industrial_applications.php>, Baymag Inc., Calgary, Alberta, Canada, Date: Feb. 2013.

Baymag Magnesium Oxide Agricultural Applications, <http://www.baymag.com/applications/agricultural_applications.php>, Baymag Inc., Calgary, Alberta, Canada, Date: 2012.

Baymag Magnesium Oxide Industrial Applications, <http://www.baymag.com/applications/industrial_applications.php>, Baymag Inc., Calgary, Alberta, Canada, Date: 2012.

Baymag Magnesium Oxide Industrial Products, <http://www.baymag.com>, Baymag Inc., Calgary, Alberta, Canada, Date: 2003.

Baymag Magnesium Oxide Environmental Applications, http://www.baymag.com/applications/environmental_applications.php>, Baymag Inc., Calgary, Alberta, Canada, Date: 2012.

Borate—Wikipedia, the free encyclopedia, <http://en.wikipedia.org/wiki/Borate>, Date: Mar. 2013.

Magnesium chloride—Wikipedia, the free encyclopedia, <http://en.wikipedia.org/wiki/Magnesium_chloride>, Date: Mar. 2013.

Magnesium sulfate—Wikipedia, the free encyclopedia, <http://en.wikipedia.org/wiki/Magnesium_sulfate>, Date: Mar. 2013.

Martin Marietta Magnesia Specialties/About Magnesium Oxide, <http://www.magnesiaspecialties.com/students.htm>, Martin Marietta Magnesia Specialties, LLC, Baltimore, MD, Date: Feb. 2013.

Mag Chem 10CR Hard Burned Technical Grade Magnesium Oxide, Martin Marietta Magnesia Specialties, LLC, Baltimore, MD, Date: 2011.

Mag Chem 10 Hard Burned Technical Grade Magnesium Oxide, Martin Marietta Magnesia Specialties, LLC, Baltimore, MD, Date: 2001.

Tomlinson, Brian H., "The Technology of Thermosetting Compounds", Journal of the Canadian Association of Drilling Contractors, 1995.

Excerpts from www.baymag.com web site. Date: Undated. The Baymag materials identified in the web site excerpts are believed to have been in use or on sale in the United States prior to Jun. 6, 1999.

Excerpts from www.britmag.co.uk and www.administrationassets.co.uk web sites. Date: Undated. The Lycal materials identified in the web site excerpts are believed to have been in use or on sale in the United States prior to Jun. 6, 1999.

International Search Report and Written Opinion, PCT/IB2013/003204, Brian Henry Tomlinson, Jan. 21, 2015.

* cited by examiner

COMPOSITIONS AND METHODS FOR CONTROLLING WELLSITE FLUID AND GAS FLOW

FIELD

The invention is related generally to control of gas and fluid flow and, more specifically, to compositions for use in controlling wellsite fluid and gas flow and methods of controlling wellsite fluid and gas flow using such compositions.

BACKGROUND

There is an ongoing need in the oil and gas exploration industry, and other industries, to control fluid (e.g., oil and water) and gas flow from within wells or other earthen formations at a wellsite. A "well" means or refers to a hole that is drilled to access producing formations to allow the exploration and recovery of natural resources such as oil, gas or water. A "wellbore" means or refers to the actual hole that forms the well. The wall or walls of the well define the wellbore "face." The wellbore and wellbore face can be encased by materials such as steel and/or cement, or the well walls may be uncased. By way of example, a wellbore may be drilled in any suitable orientation including vertical, horizontal and/or angled and can include a combination of vertical, horizontal and angled portions.

Settings in which containment of fluid and gas flow is required include, for example, drilling of new wells, re-drilling of existing wells and workover operations.

When a new well is drilled, a drilling fluid is used to control subsurface pressures. In unusual circumstances, such as total loss of the drilling fluid, attempts may be made to use cement. In certain applications, the cement can be used to provide a type of covering or "sheath" encasing the wellbore face. The cement covering is intended to seal the wellbore face and prevent fluid and gas flow therethrough. In other applications, cement can be used to secure casings within the wellbore and to provide a fluid-and-gas tight barrier between the casings and the surrounding formation.

Care must be taken not to damage the earthen formation, particularly when drilling a well in the "production zone" of the formation. The production zone refers to the portion of the formation from which fluids and/or gas are to be extracted.

Conventional Portland-type cements are frequently used to cover the wellbore face or to secure a production liner within the production zone. Such Portland-type cements are pumped into the wellbore as flowable slurry and displaced into the external annulus of the casing liner to cement the production liner into the formation. In upper casing sections above the production liner, the cement, particularly at the cement "shoe," can be drilled out to allow further drilling as the well progresses. The production liner and cement can subsequently be perforated to allow fluid and gas to flow into the production liner.

A problem with the use of Portland-type cements for these and other types of wellbore applications is that such cements tend to have a relatively slow and unpredictable transition from a flowable slurry to a solid state. While in the flowable slurry state, the Portland-type cement can migrate back into the earthen formation around the wellbore. Such migration can be a particular problem in the production zone because the cement can fill cavities deep within the formation blocking flow of fluid and gas to the production liner and potentially requiring costly remedial operations to restore oil and gas flow from the formation.

A further problem with Portland-type cements is that the relatively slow transition of the cement from flowable slurry to solid state can cause such cements to form an incomplete barrier to fluid and gas flow into the wellbore, thereby permitting fluids and gas to pass through the cement in an uncontrolled manner. This problem is referred to as "channeling."

By way of example, Portland-type cement is frequently used to secure a surface casing within the well at what is known as the casing shoe. At the casing shoe, a surface casing end distal to the surface of the wellsite is encased in cement. This volume of cement is displaced out of the casing by "dropping a ball", which is drillable, on top of the cement. The ball is then pumped down to the casing shoe with drilling fluid. Once hardened, the ball, shoe and cement is drilled out. An inner casing can then be extended through the outer casing and past the casing shoe deeper into the well.

While the cement around the casing shoe is in the flowable slurry state, hydrostatic pressure exerted by the drilling fluid prevents fluid and gas flow through the cement. However, when the cement transitions from flowable slurry to the solid state, it forms a "gel" which provides the cement with a slight strength. The slight strength of the cement reduces the hydrostatic pressure on the formation thereby allowing fluids and gas to pass through, or channel through, the cement resulting in the channeling problem. The channeling creates small holes and voids through which fluid and gas can pass through the cement. The channels formed in the cement persist after the cement hardens to the solid state. The channels cause the cement to provide an incomplete barrier between the formation and the wellbore so that fluid and gas can pass vertically or horizontally through the cement, exterior to the casing and migrate through the formation exterior to the casing in an uncontrolled manner. This uncontrolled flow of fluid and gas into the well represents a problem for the well operator.

Existing wells are frequently re-drilled to extract additional oil and gas from the earthen formation around the wellbore. "Tight oil" is a term used to describe re-drilling of existing vertical wells in a horizontal direction, especially under conditions of low reservoir porosity and permeability. In underbalanced or unpressurized wells in which oil will not flow because of the lack of formation pressure the wells must be pumped by mechanical means to lift the oil to the surface. Horizontal drilling of old wells can advantageously open the reservoir to further exploitation by greatly increasing the productive area of the formation which is exposed to the wellbore. Many of these re-drilled wells are hydraulically fractured to open the formation even further so as to better access the oil and gas in the formation.

As described previously, it is of particular importance that the cement used to secure casings and the production liner within the production zone does not flow into and damage the production zone. Unwanted migration of cement into the formation can be a particular problem in tight oil applications in which the underbalanced or unpressurized formation does not provide a force resisting cement migration into the formation.

In workover operations, such as replacing corroded or damaged production tubing, the well operator is required to completely seal the wellbore to contain all oil and gas in the well. This containment must be completed before the wellhead or blow out preventer (BOP) can be removed to perform the workover repairs. Complete containment of oil and gas in the well is referred to as "killing" the well because oil and gas cannot flow through the wellbore to the earth surface at the well site.

The complete sealing of the wellbore to contain the oil and gas in the well is frequently accomplished by use of a polymerized brine which hydrostatically overbalances any formation pressure in the reservoir. This fluid is typically a polymerized calcium carbonate brine. The column of brine in the wellbore provides the hydrostatic force.

A disadvantage of the fluids used for this purpose is that the hydrostatic pressure can force the fluid back into the earthen formation around the wellbore. This hydrostatic pressure must be greater than the formation pressures it is designed to contain. This is termed "overbalance." Workover fluids are intended to prevent this fluid invasion into the earthen formation by including a particulate constituent, usually calcium carbonate, into the fluid. As the polymerized fluid is forced back into the formation by hydrostatic pressure the calcium carbonate particulates "screen-out" at the wellbore face. The calcium carbonate forms a "cake" along the wellbore face which is intended to block fluid invasion into the earthen formation.

In actual practice, the calcium carbonate cake is continuously eroded by the dynamics of circulating the drilling fluid within the well to remove unwanted debris and particulates and to keep the calcium carbonate brine clean. And, the running in and out of the wellbore of various tools and new production tubing, etc. contributes to the erosion. This continuous erosion and deposition cycle means that polymerized brine is forced outwardly from the wellbore into the earthen formation as the calcium carbonate cake is eroded and redeposited. The potential for damage to the production formation under these circumstances is high. Once the workover is completed and the well is brought back into production, wells with positive formation pressure will attempt to "flow back" this polymerized filtrate into the well. In reservoirs with high porosity/permeability characteristics the operator of the well may be able to clear the formation of the invasive fluid minimizing any residual damage. However, in underbalanced wells, positive formation pressure is lacking and this lack of pressure permits polymerized brine drilling fluid to flow away from the wellbore and into the reservoir. The greater the porosity or permeability of the reservoir, the further back into the earthen formation the polymerized brine drilling fluid may flow. If the polymerized brine drilling fluid flows into the earthen formation to a significant extent, then oil and gas flow from the formation may be blocked by the polymerized brine drilling fluid which in an oil well can form an emulsion within the formation potentially requiring costly remedial operations to restore oil and gas flow from the formation.

Cost is another potential disadvantage of drilling fluids. As an example, calcium bromide brine is particularly expensive and potentially hazardous to the environment.

In other workover settings, it may be necessary to repair damage to casings and other structure used to line the well walls. Any damage to the casings can permit unwanted oil and gas to flow through the casings to the surface around the well site. As previously described, casings are frequently set in place within the wellbore by means of cement. Also as mentioned previously, an endemic problem with Portland-type cements is the formation of gels between the fluid and the set state which can result in the formation of channels in the set cement. Oil and gas from the formation can be forced through any such cracks, into the casings and out of the well either through the casings, or, external to the casing through the formation. This can cause pressure to build up between casings as the oil or gas can be trapped above the problem point. Casings can also corrode over time allowing fluids and gas to enter, or exit the corroded casings in an uncontrolled manner. It can also allow influx of the external formation. This can be particularly troublesome where corroded casing allows the influx of sand into the wellbore. Sand can block the wellbore.

Portland cements and magnesium oxysulfate cements have been utilized in workover operations and drilling operations in an effort to remediate these problems. Magnesium oxysulfate cement is limited to one product formerly known as Magnaplus™ which is sold by the Baker Hughes Company. Magnaplus was originally designed to "convert" in-situ drilling fluid into placement through addition of magnesium sulfate into a magnesium-based drilling fluid. However, these materials have proven to be less than satisfactory because both Portland cement and magnesium oxysulfate cement formed in this way, have an extended gel state before hardening which permits oil and gas to form channels and passages in the hardened cement as previously described. Gel strength generation and the resultant channel formation is an important disadvantage which affects the use of Portland cements and magnesium oxysulfate cements for use in drilling new wells, re-drilling existing wells and workover and remedial operations. Furthermore, allowing the influx of high gel oxysulfates into the production zone where they set and generate compressive strengths, is potentially disastrous as the oxysulfates cannot be removed from the production zone. Although oxysulfates are acid soluble, they must be able to be contacted by the acid to be removed. If the oxysulfate material is too far back in the formation, it cannot be contacted by the acid. A further disadvantage of converting an in situ fluid to a cement is that the wellbore operator would incorporate all the particulate and drilling debris into the cement providing the potential for even greater damage.

Magnesium oxychloride cements have been proposed for use in wellbore operations. See U.S. Pat. No. 6,664,215 (Tomlinson). While excellent for the intended purpose, magnesium oxychloride cements have certain limitations. Magnesium oxychloride chemistry requires preparation of the cement with a concentrated brine. And, the magnesium oxide and chloride ion ratios are only variable within a very narrow range. Magnesium oxychloride cements have utilized relatively low reactivity magnesium oxides because of the lack of controllability of the set point with higher reactivity oxides. This leads to a slower set and the potential for formation of gels. It would be desirable to permit the use of high reactivity magnesium oxides which have better performance.

It would be an improvement in the art to provide an improved composition and methods for limiting, or preventing, the influx of fluids and/or gas into the wellbore from the surrounding formations, which would be noninvasive, which would have predictable and controllable physical properties capable of permitting engineered application of the composition in a variety of environments and conditions and which would avoid the generation of gels and channeling between the flowable and solid states of the composition.

SUMMARY

Magnesium oxysulfate cement compositions and methods of controlling gas and fluid flow from a wellbore using such compositions are described herein. In embodiments, magnesium oxysulfate cement compositions comprise an admixture of about 33% to about 38% by weight magnesium oxide, about 22% to about 38% by weight magnesium sulfate trihydrate, and about 15% to about 25% by weight water. The cement slurry rapidly transitions from a flowable state to a solid state with formation of little or no gel strength before the transition to form a barrier which controls the gas and fluid flow. Compositions have a near-linear relationship between the time required for the transition to occur and the composition temperature at which the transition occurs providing the user with tight control over the amount of time within which the transition occurs and sufficient time to place the composition at the desired location within the wellbore.

In an embodiment, the water may comprise a brine. An exemplary brine may comprise an admixture of water and magnesium chloride hexahydrate. The magnesium chloride hexahydrate may comprise about 22% to about 38% of the composition. The magnesium oxide and magnesium sulfate are preferably admixed with the brine. In other embodiments, the water may comprise fresh water. Sea water may also be utilized demonstrating the versatility of the magnesium oxysulfate cement compositions.

Additives such as inhibitors, accelerators and combinations of inhibitors and accelerators may be incorporated in to the magnesium oxysulfate cement compositions to permit the user to further extend or shorten the time within which the transition from the flowable state to the solid state occurs. In an embodiment, an inhibitor which extends the time within which the transition occurs may be provided in an amount of about 0.001% to about 5% by weight based on the weight of the magnesium oxide. Borate salts are a preferred inhibitor. In an embodiment, the borate salt is sodium tetraborate decahydrate. In a further embodiment, the inhibitor is sodium hexametaphosphate.

Also in an embodiment, an accelerator which extends the time within which the transition occurs may be provided in an amount of about 0.001% to about 20% by weight of the magnesium oxysulfate cement compositions. Anhydrous magnesium sulfate is an example of an accelerator. Other additives such as hydroxyethylcellulose viscosity modifiers, silica bead volumizing additives, and weighting agents such as barite and galena may be included.

In a method embodiment, a method for preventing fluid and gas flow through a wellbore space defined by an inner casing and an outer casing which surrounds the inner casing is disclosed. In an embodiment, the method comprises a step of preparing a cement slurry to be injected into the wellbore space. In a further step of the embodiment, a cement slurry supply line is placed into the wellbore space between the casings. The supply line has at least two lateral outlets providing plural directional and lateral flow of the cement slurry away from the supply line. In a next step of the embodiment, the cement slurry is injected into the wellbore through the supply line and the at least two lateral outlets. In the embodiment, the cement slurry simultaneously flows at least bi-directionally in both clockwise and counterclockwise directions around the wellbore space generally orthogonal to the axis with minimal axial flow. The cement completely fills an axial region of the wellbore space to form a solid plug between the casings. The plug prevents fluid and gas flow through the wellbore. In such embodiment, the cement slurry rapidly transitions from a flowable state to a solid state to form the plug with formation of little or no gel strength before the transition. The cement slurry has a near-linear relationship between the time required for the transition to occur and the composition temperature at which the transition occurs. Magnesium oxysulfate cement compositions are suitable for implementing the method.

In a further aspect of the method, a determination is made of a fluid, such as drilling fluid, filling the wellbore space. The user may then set the specific gravity of the cement slurry to be approximately the same as that of the fluid. This facilitates flow of the cement slurry around the wellbore space. As part of this process, the user may determine the specific gravity of the cement slurry and then adjust the specific gravity of the cement slurry so that it is approximately the same as that of the fluid. The specific gravity of the cement slurry can be adjusted by addition of at least one weight modifier. Weight modifiers can include silica beads, barite, galena and mixtures of these materials. Accelerators and/or inhibitors maybe added to extend or shorten the time within which the transition from the flowable state to the solid state occurs.

The method may be used to inject the cement slurry into the wellbore space between a centralizer in the wellbore space and a well surface opening. This method prevents fluid and gas flow through the wellbore space past the centralizer and toward the surface opening. In an embodiment, the centralizer supports the inner casing within the outer casing. The user may identify a source of the fluid and gas flow through the wellbore space and then place a supply line into the wellbore space between the centralizer and the well surface opening with the centralizer being between the source of the fluid and gas flow. This enables the cement slurry to be delivered to a position in the wellbore which can prevent further fluid and gas flow.

A preferred supply line comprises a tube having an end and at least two lateral outlets proximate the end through which the cement composition is discharged. In embodiments, the lateral outlets face in opposite directions to allow at least bi-directional outflow of the cement slurry from the supply line and outlets and into and around the wellbore space. The tube may comprise an axial tube or a coiled tube.

In another method aspect, magnesium oxysulfate cements may be used in workover operations to control and stop fluid and gas flow from the formation and between an outer casing and the formation.

BRIEF DESCRIPTION OF THE DRAWINGS

Exemplary compositions and methods may be understood by reference to the following description taken in conjunction with the accompanying drawings, in which like reference numerals identify like elements throughout the different views. The drawings are not necessarily to scale, emphasis instead being placed upon illustrating the principles of the invention. The drawings depict only embodiments of the invention and are not therefore to be considered as limiting the scope of the invention. In the accompanying drawings:

FIG. 3A is a schematic fragmentary view of an outlet portion of the exemplary cement supply line of FIGS. 2-4;

DETAILED DESCRIPTION

Figure 1:
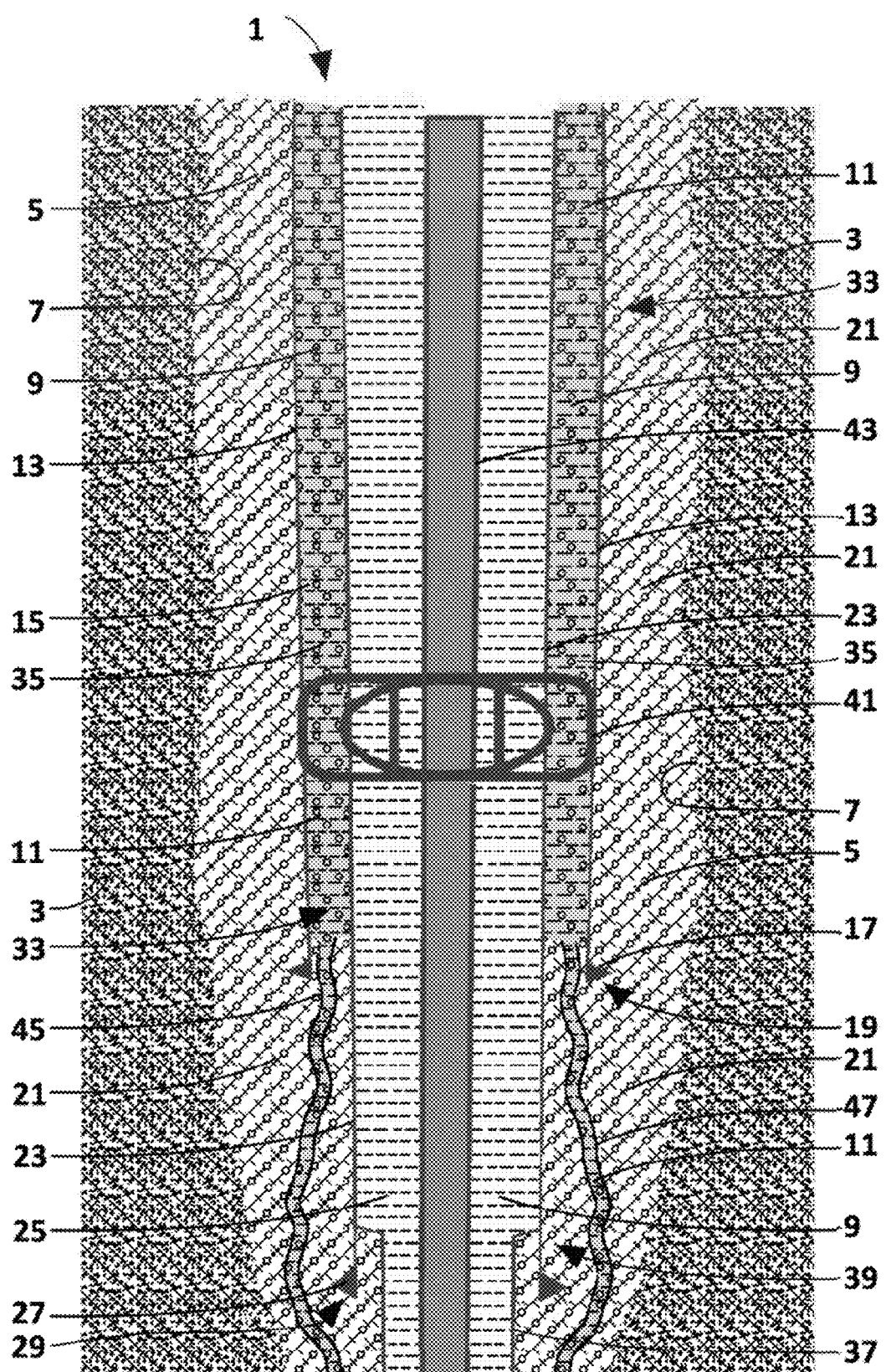
FIG. 1 is a schematic side elevation view illustrating a wellbore and uncontrolled gas flow between an inner casing and a surface casing of a drill string with certain hidden portions of a centralizer indicated by broken lines.

Exemplary compositions for use in controlling wellsite fluid and gas flow and methods of controlling wellsite fluid and gas flow using such compositions will now be described in detail with respect to the detailed description and examples which follow. The preferred embodiments described herein are not intended to be exhaustive or to limit the invention to the precise form disclosed. The section headings provided herein are for convenience only and are not intended to limit the scope of the invention in any way.

DEFINITIONS

"A" or "an" means one or more unless expressly indicated otherwise.

"About" means approximately or nearly, and in the context of a numerical value or range set forth herein, means±10% of the numerical value or range recited or claimed.

"Admix" means to mix or blend.

"Average particle size" means or refers to the average particle diameter by volume in a distribution of particles.

"Cement" means or refers to a substance that sets and hardens and can bind other materials together.

"Flowable state" means or refers to a state in which a material flows.

"Hardening" or "hardened" means or refers to the transition of a material from a flowable state to a solid state. Persons of skill in the art will appreciate that cement compositions continue to harden and gain compressive strength subsequent to forming a solid state.

"Ramp" means or refers to the time to deliver magnesium oxysulfate cement compositions to the site at which the cement composition is to be placed. During the ramp, magnesium oxysulfate cement compositions are influenced by the ambient temperature of the surrounding earthen formation or other environment. The ramp is simulated in consistometer trials by gradually increasing the consistometer temperature in which a given magnesium oxysulfate cement composition is located.

"Right-angle set" means or refers to a characteristic of the cement composition in which the cement composition undergoes a near-immediate transition from a flowable state to a solid state. The right-angle set derives its name from the shape of the curve produced on a graph when determining the viscosity of the cement composition as a function of cement composition temperature.

"Solid state" means or refers to a physical state in which a material resists changes in size and shape.

Unless stated otherwise, the weight percentages provided herein are based on the total composition including all constituents (hereinafter the "total composition").

The present invention relates to unique magnesium oxysulfate cement compositions. For simplicity and brevity, such magnesium oxysulfate cement compositions are also referred to herein simply as "compositions." The cement compositions undergo a transition from a flowable state to a solid state in a predictable and controllable manner with little or no formation of gel strength. The predictable manner of the transition provides many benefits, including improved capability to place the magnesium oxysulfate cement compositions where needed and an improved form of solid-state mass which can provide a plug or obstruction free of channels and voids thereby blocking passage of substances such as fluids and gas through the solid-state mass. Applications for exemplary magnesium oxysulfate cement compositions include, for example, use in the drilling industry for fluid and gas containment. The containment may include wellbore shut off. Other non-limiting applications of the exemplary magnesium oxysulfate cement compositions in the drilling industry include wellbore remediation and formation production enhancement, and formation protection.

The transition from the flowable state to the solid state is predictable because there is a near-linear relationship between the time required for the transition to occur and the composition temperature at which the transition occurs. This relationship between the time of transition and the composition temperature is referred to herein as a "near-linear set" because of the generally linear shape of the graph depicting the transition as described herein. In certain embodiments, referred to as high-temperature (HT) magnesium oxysulfate cement compositions, the transition occurs when the internal temperature of the composition is about 72° C. In other embodiments, referred to herein as low-temperature (LT) magnesium oxysulfate cement compositions, the transition occurs when the internal temperature of the composition is about 62° C.

When the transition occurs, it is near-immediate. This near-immediate transition from the flowable state to the solid state is referred to herein as a "right-angle set" because of the shape of the graph depicting the transition as described herein. The near-immediate transition avoids formation of gel strength and the resultant "channeling" and formation of voids and channels which compromise the ability of the solid state mass to block fluid and gas flow therethrough.

Therefore, a user can determine the amount of time in minutes and hours at which embodiments of the magnesium oxysulfate cement compositions will rapidly transition from flowable state to solid state for any given use of the compositions. The user need only know: (1) the ambient temperature of the wellbore or other location at which the magnesium oxysulfate cement compositions will be used, and (2) the amount of time required to displace the magnesium oxysulfate cement compositions to the desired location. The known temperature and time of displacement affect the time at which magnesium oxysulfate cement compositions undergo the transition. The greater the ambient temperature and the more rapidly the compositions are displaced to the desired location, the more rapidly the transition occurs and vice-versa. This is because the compositions will gain heat more quickly from the surrounding formation if the compositions are rapidly delivered to the desired location within the wellbore. The user can then select the appropriate magnesium oxysulfate cement composition and composition additives to provide a magnesium oxysulfate cement composition which will undergo the transition at the desired time under the temperature and conditions of use thereby providing complete control over timing of the transition from the flowable state to the solid state. These characteristics are valuable to the user because they enable the magnesium oxysulfate cement compositions to be pumped to the exact wellbore location of use followed by hardening at a known time with formation of little or no gel strength.

A further characteristic of exemplary magnesium oxysulfate cement compositions is that the compositions can be formulated to have excellent compressive strength properties. This means that the magnesium oxysulfate cement compositions achieve a high compressive strength very rapidly, much more rapidly than Portland cement. Rapid formation of compressive strength is advantageous because a well can be placed back into service more rapidly than a well in which Portland cement is used. Rapid formation of a high compressive strength permits the well to be returned to service in less time avoiding down time for the drilling rig and providing a better return on investment for the operator.

Importantly and unlike Portland-type cements, magnesium oxysulfate cement compositions can be pumped "through the bit" providing substantial cost savings to the operator. Compositions as described herein can be pumped through the bit because the near-linear set characteristics enable the time for the transition to both be controllable and predictable. Portland cements which lack this control and predictability are not pumped through the bit. To pump Portland cement through the drill string the drill string must first be removed from the well and the bit removed. The drill string must then be run back into the well "open ended" (without the bit) before cement can be pumped through the drill string. In deep wells this is an extremely time consuming and costly operation.

Magnesium oxysulfate cement compositions of the types described herein have broad versatility with respect to formulation because magnesium oxysulfate cement compositions can be prepared with fresh water, sea water or with brines having salinity greater than sea water.

Cement compositions of a magnesium oxychloride type lack the formulation versatility of the magnesium oxysulfate cement compositions because such magnesium oxychloride cement compositions must be formulated by admixture with a concentrated brine. Fresh water and sea water alone cannot be used to formulate magnesium oxychloride cement compositions. And, the ratio of the magnesium oxide and chloride ions (from the brine) of magnesium oxychloride cement compositions are variable only within very narrow limits. If the ratio is outside these limits, the physical characteristics, such as compressive strengths and set times can be adversely affected.

Magnesium oxysulfate cement compositions of the type described herein are highly tolerant of both organic and inorganic contaminants.

Magnesium oxysulfate cement compositions can be engineered to operate at temperature ranges previously not achievable. By selection of a magnesium oxide with the desired reactivity and/or selection of the appropriate concentration of an accelerator (such as anhydrous magnesium sulfate), magnesium oxysulfate cement compositions can be engineered to operate at temperatures from below freezing, (e.g., minus 30° C.) to, and including, very high temperatures (e.g., about 130° C.).

In preferred embodiments, a magnesium oxysulfate cement composition comprises an admixture of magnesium oxide (MgO), magnesium sulfate trihydrate ($MgSO_4.3H_2O$) and water. When admixed, such constituents are initially in a flowable state to provide a flowable slurry. The water may be fresh water, sea water, and/or brine. An exemplary brine may comprise magnesium chloride hexahydrate ($MgO.6H_2O$) and water. Additives may optionally be included. Exemplary additives include inhibitors, for example, borate salt inhibitors, and accelerators, such as anhydrous magnesium sulfate accelerator. Other additive such as water reducers and salt tolerant viscosifiers (e.g., hydroxyethylcellulose), weighting agents (e.g., barium sulfate, galena) and volume modifiers (e.g., silica beads) can be included.

Magnesium oxysulfate cement compositions can be formulated to undergo the transition from the flowable state to the solid state (i.e., the right-angle set) by proper selection of the magnesium oxide constituent, magnesium sulfate trihydrate and optional accelerators and inhibitors. Careful selection of the appropriate constituents enables adjustment of the magnesium oxysulfate cement compositions for use with the environmental temperatures and conditions in which the cement composition is to be utilized. And, combinations of constituents and additives may be selected for fine adjustment of the magnesium oxysulfate cement compositions for existent environmental temperature conditions.

For example, a relatively greater environmental temperature in the wellbore may require formulation of the magnesium oxysulfate cement composition with a magnesium oxide constituent suited for use in higher-temperature environmental conditions. The magnesium oxysulfate cement composition for such an application could include an inhibitor constituent to retard or delay the transition from the flowable state to the solid state as needed. Conversely, a relatively lower environmental temperature in the wellbore may require formulation of the magnesium oxysulfate cement composition with a magnesium oxide suited for use in lower-temperature environmental conditions. In such applications, an accelerator constituent could be included with the magnesium oxysulfate cement composition to accelerate or hasten the transition from the flowable state to the solid state. It is critically important that the magnesium oxide used in both high and low temperature conditions has the correct reactivity to provide a reaction which provides a controllable right-angle set.

By way of example, magnesium oxysulfate cement compositions can be formulated to undergo the transition from the flowable state to the solid state (i.e., the right-angle set) in a predictable manner at a relatively greater environmental temperature range of about 70° C. to about 130° C. Such magnesium oxysulfate cement compositions can be thought of as having an operational range of about 70° C. to about 130° C. and can be further thought of as being "high-temperature" embodiments of the compositions. The environmental or operational temperature range means or refers to the ambient temperature of the area in which the magnesium oxysulfate cement composition is to be placed, for example, the temperature of the earthen formation, casing or drill string.

By way of further example, magnesium oxysulfate cement compositions can be formulated to undergo the transition from the flowable state to the solid state (i.e., the right-angle set) in a predictable manner at a relatively lower environmental temperature range of about 40° C. to about 80° C. Such magnesium oxysulfate cement compositions can be thought of as having an operational range of about 40° C. to about 80° C. and can be further thought of as being "low-temperature" embodiments of the compositions.

Magnesium oxysulfate cement compositions can be formulated to predictably undergo the transition from the flowable state to the solid state in an environmental and operational range below about 40° C., including as low as −30° C., and can be thought of as being "very-low-temperature" embodiments of the compositions. In embodiments used in environmental temperatures below about 40° C. it is desirable to include an accelerator. At environmental temperatures below 0° C. it is further desirable to use a brine solution made, for example, with magnesium chloride hexahydrate brine to prevent freezing of the mix water. The magnesium chloride hexahydrate may be mixed with sea water if required. Very low temperature embodiments of magnesium oxysulfate cement compositions including brine will be resistant to freezing down to temperatures of about −30° C. At these very low temperatures, magnesium oxysulfate cement compositions can be premixed and kept for a considerable time before use if desired with any accelerator being added immediately prior to use. Preheating of the mix water may also be desirable for use in extreme cold temperatures.

The amount and type of the magnesium oxide constituent has been found to affect the temperature at which the magnesium oxysulfate cement compositions undergo the transition from flowable state to the solid state and the related right-angle set. In embodiments, the magnesium oxide comprises about 33% to about 38% by weight of the total composition. Higher and lower temperature range magnesium oxysulfate cement compositions can be formulated to include magnesium oxides within the aforementioned range. For certain magnesium oxysulfate cement composition embodiments formulated with brine, a range of about 33% to about 37% by weight of magnesium oxide may be implemented. For certain magnesium oxysulfate cement composition embodiments formulated with fresh water, about 37% by weight magnesium oxide may be implemented to produce a preferred composition.

The greater the weight percent of magnesium oxide in the magnesium oxysulfate cement composition, the relatively less time is required for the magnesium oxysulfate cement compositions to undergo the transition from the flowable state to the solid state, that is the right-angle set.

Magchem 10 magnesium oxide available from Martin Marietta Magnesium Specialties of Woodville, Ohio is an example of a magnesium oxide which can be used in magnesium oxysulfate cement compositions with relatively higher temperature operational ranges. Magnesium oxysulfate cement compositions including Magchem 10 can be formulated to have an operational range of about 70° C. to about 130° C. Magchem 10 magnesium oxide is calcined at temperatures of about 900° C. to about 1200° C. Magchem 10 has a particle size of between about 3μ and about 15μ by volume.

Baymag 40 magnesium oxide available from Baymag of Alberta, Calgary, Canada is an example of a magnesium oxide which can be used in magnesium oxysulfate cement compositions at relatively lower temperature operational ranges. Magnesium oxysulfate cement compositions including Baymag 40 can be formulated to have an operational range of about 40° C. to about 70° C. This operational range can be extended lower, for example to about −30° C., which is particularly useful in arctic environments. Magnesium oxysulfate cement compositions including Baymag 40 magnesium oxide are less effective at temperatures above this operating range because they will undergo the transition from flowable slurry to solid very rapidly at temperatures greater than about 70° C. and would become uncontrollable. Baymag 40 magnesium oxide is calcined at temperatures of about 800° C. and has a particle size of between about 3μ and about 15μ by volume.

Without wishing to be bound by any particular theory, it is thought that the calcining temperatures of the respective Magchem 10 and Baymag 40 magnesium oxides may contribute to their effectiveness in magnesium oxysulfate cement compositions having respectively greater or lower environmental and operational temperature ranges. The relatively higher calcining temperature of the Magchem 10 reduces the reactivity of that magnesium oxide while the relatively lower calcining temperature of the Baymag 40 increases the reactivity of that magnesium oxide permitting each form of magnesium oxide to be used in the respective relatively greater or lower environmental and operational temperature ranges.

Exemplary magnesium oxysulfate cement compositions formulated with Magchem 10 and Baymag 40 magnesium oxides can be modified to predictably undergo the transition from flowable state to the solid state and the right-angle set at operational temperature ranges other than those described above. For example, magnesium oxysulfate cement compositions with a combination of magnesium oxides can be formulated should a slower or faster time to harden at a particular operational temperature be desired.

In embodiments, the magnesium sulfate trihydrate comprises about 22% to about 38% by weight of the total composition. By way of example only, about 22% to about 24% by weight of magnesium sulfate trihydrate may be implemented in certain magnesium oxysulfate cement composition embodiments formulated with brine. And, for certain other magnesium oxysulfate cement composition embodiments formulated with fresh water, about 37% by weight magnesium sulfate trihydrate may be implemented to produce a preferred example of a composition. Magnesium sulfate trihydrate is available from Giles Chemical Company of Waynesville, N.C.

Water is admixed with the magnesium oxide and magnesium sulfate trihydrate to prepare the magnesium oxysulfate cement compositions in flowable slurry form. In embodiments, water comprises about 15% by weight to about 25% by weight of the total composition, with about 15% to about 22% water being preferred for embodiments including brine and about 24% to 25% being preferred for embodiments formulated with fresh water. Embodiments of magnesium oxysulfate cement compositions formulated with brine generally require a lesser amount of water due to the added water fraction contributed by the magnesium chloride.

An advantage of magnesium oxysulfate cement compositions is that they may be formulated with fresh water, sea water or with brines. Fresh water refers to water that is not salt water. Sea water refers to a weak brine comprising water with up to about 25,000 ppm chlorides (e.g., about 3.5% by weight). More concentrated brines may comprise water having a salt concentration of from about 1% to about 30% by weight. In an embodiment, the brine may comprise a ratio of about 1.33 kg magnesium chloride hexahydrate to about 1 L water. The optional use of brines in formulating magnesium oxysulfate cement compositions yields a cement composition with a compressive strength which can be relatively greater than cement compositions formulated with fresh water. Also, cement compositions formed using a brine have a much lower freezing point than fresh water. The near-immediate transition from flowable slurry to solid state and right-angle set occur with compositions formulated with either fresh water or brine.

Brines for use in preparing magnesium oxysulfate cement compositions may be naturally-occurring (e.g., sea water) or may be formulated. In embodiments, an exemplary brine may comprise an admixture of magnesium chloride hexahydrate and water. Preferably, the magnesium chloride hexahydrate comprises about 10% to about 30% by weight of the total composition, with about 22% to about 24% by weight of the total composition being a more preferred range. A brine embodiment may comprise about 83% by weight magnesium chloride hexahydrate and about 17% by weight water in the brine. A source of magnesium chloride hexahydrate is Great Salt Lake Minerals Corporation of Ogden, Utah.

The capability of formulating magnesium oxysulfate cement compositions with fresh water, sea water and with brines having a range of salt concentrations provides the user with formulation flexibility because the range of water sources is expanded. This formulation flexibility can be important to the user because the source of readily-available water is not always predictable.

In embodiments, the time at which the magnesium oxysulfate cement compositions predictably harden can be controlled, that is decreased or increased, by proper selection of additives such as an accelerator, an inhibitor and combinations of accelerators and/or inhibitors. Selection of the magnesium oxide, accelerator and inhibitor provides the user with tight control over the time in which the magnesium oxysulfate cement compositions will undergo the transition from the flowable state to the solid state and the right-angle set. Accelerators are thought to increase the rate at which the magnesium oxysulfate cement compositions transition from the flowable state to solid state while inhibitors are thought to decrease the rate at which the magnesium oxysulfate cement compositions transition from the flowable state to the solid state.

Preferably, an accelerator comprises about 0.001% to about 20% by weight of the total magnesium oxysulfate cement composition. Advantageously, the amount of accelerator can be varied almost infinitely depending on the environmental temperatures encountered in the wellbore to achieve the desired time within which the compositions transition from the flowable to the solid state. Anhydrous magnesium sulfate is a preferred accelerator. Anhydrous magnesium sulfate accelerator is believed to decrease the amount of water in the flowable slurry while increasing the relative magnesium ion concentration. The greater the relative magnesium oxide/ion concentration, the more reactive the magnesium oxysulfate cement composition. An accelerator such as anhydrous magnesium sulfate can be highly efficacious in accelerating the transition from the flowable state to the solid state when using the magnesium oxysulfate cement compositions in lower temperature environments such as below 40° C. and in very low temperature environments approaching about −30° C. and colder. Accelerators are not limited to lower temperature environments and may be used in temperature conditions above 40° C. A source of anhydrous magnesium sulfate is PQ Corporation, of Malvern, Pa.

Preferably, an inhibitor comprises about 0.001% to about 5% by weight based on the magnesium oxide fraction of the magnesium oxysulfate cement composition, with 0.5% to about 5% by weight based on the magnesium oxide being more preferred. The actual amount depends on the environmental temperature at which the composition is utilized and the time required to pump and displace the composition to the desired location in the wellbore or elsewhere. Exemplary inhibitors include borate salts. An example is sodium tetraborate decahydrate, also known as borax ($Na_2B_4O_7 \cdot 10H_2O$). Borates are the name for a large number of boron-containing oxyanions. Borate compounds are believed to retard, or inhibit, the early hydration rate of the magnesium oxide by forming a film on the surface of the magnesium oxide decreasing the temperature at which the magnesium oxysulfate cement composition undergoes the transition from the flowable state to the solid state and increasing the pH value of the system. A source of borax is American Borate Company of Virginia Beach, Va. Sodium hexametaphosphate is another example of an inhibitor.

The magnesium oxide, magnesium sulfate trihydrate and optional magnesium chloride hexahydrate are preferably supplied at the well site in the form of dry granular powders. Accelerators such as anhydrous magnesium sulfate and inhibitors such as borate salt are also preferably provided as dry granular powders. Each constituent may be supplied and packaged separately. The cement composition constituents are admixed with water. The water may consist of fresh water, sea water or a brine. Brine may include magnesium chloride hexahydrate and water. The constituents produce a batch of the flowable slurry.

Alternatively, constituents may be pre-mixed and supplied together in a pre-packaged form which can also be thought of as a pre-mixed form. For example, magnesium oxide and magnesium sulfate trihydrate for a high-temperature magnesium oxysulfate cement composition (e.g., operational range of about 70° C. to about 130° C.) or for a lower temperature magnesium oxysulfate cement composition (e.g., operational range of about 40° C. to about 75° C.) could be supplied as dry granular powders pre-mixed in a package. The magnesium oxysulfate cement composition could subsequently be prepared as a flowable slurry by admixture of the dry components with water shortly before use.

By way of further example, a magnesium oxysulfate cement composition for a very low temperature operational temperature range (e.g., an operational range below 40° C.) may include magnesium oxide and magnesium sulfate trihydrate supplied pre-mixed in a package. An anhydrous magnesium sulfate accelerator could be supplied as a separate dry granular material. The magnesium oxysulfate cement composition could be prepared as a batch of flowable slurry by admixture of the dry components with water. Inhibitors and additional accelerators could be added to the batch as desired.

In premix embodiments, the premix may comprise magnesium oxide and magnesium sulfate trihydrate in a ratio of about 1:1 to about 3:2 (magnesium oxide to magnesium sulfate trihdyrate). When admixed with water, the compositions rapidly transition from a flowable state to a solid state with formation of little or no gel strength before the transition and a near-linear relationship between the time required for the transition to occur and the composition temperature at which the transition occurs.

In embodiments, about 1% to about 5% by weight of a viscosity modifier such as hydroxyethylcellulose may be utilized. In embodiments up to about 20% by weight of silica beads may be added to decrease specific gravity and add volume.

Magnesium oxysulfate cement compositions of the types described herein are extremely versatile and can be formulated to offer the user the opportunity to customize and tailor the formulation so that it sets within a desired time for a given application. For example, the magnesium oxide can be selected for optimal functionality based on the temperature of the environment in which the magnesium oxysulfate cement composition will be applied. Combinations of magnesium oxides may be suitable for certain downhole wellbore operations for any given environmental temperature. Virtually any combination of separate inhibitors and accelerators, or combinations of inhibitors and accelerators, may be utilized to further customize or tailor the magnesium oxysulfate cement compositions so that a given batch of the composition will set within the desired time. And, the amounts of inhibitors and accelerators used may be adjusted within ranges to further customize the composition for a given application.

The specific gravity and viscosity of the magnesium oxysulfate cement compositions can be modified to exceed, be less than, match, or otherwise approximate the specific gravity and viscosity of any drilling fluid or other fluid that may be present in the wellbore. This capability to modify the specific gravity and viscosity of the magnesium oxysulfate cement composition is particularly useful for practicing the shut off methods described herein. In such methods, lateral or sideways flow of the cement composition generally orthogonal to a wellbore or casing axis with minimal axial flow of a magnesium oxysulfate cement composition between inner and outer casings is desired. The cement composition forms a plug or collar which acts as a barrier to fluid and gas flow between the casings. Accordingly, virtually any combination and amount of weighting agents (e.g., barite or galena), weight decreasing and volumizing agents (e.g., silica beads) or other agents can be implemented to achieve the desired specific gravity and viscosity of the magnesium oxysulfate cement compositions.

Magnesium oxysulfate cement compositions as described herein have been found to have a "right-angle set" as previously stated and as illustrated in the Examples. The right-angle set may be characterized by a near-immediate transition of the cement composition from a flowable-state to a solid state. The near-immediate transition avoids formation of channeling and voids in the solid-state cement composition that would permit fluid and gas to pass through the hardened cement composition. Initially and once placed in the wellbore, the flowable magnesium oxysulfate cement composition slurry fills and seals the wellbore preventing fluid and gas flow. The initial sealing of the wellbore is possible because the flowable-state magnesium oxysulfate slurry cement composition has essentially no gel strength. The hydrostatic force provided by the flowable magnesium oxysulfate slurry cement composition balances or counteracts any pressurized fluid and gas flow from the well and blocks passage of fluid and gas past the slurry through the wellbore.

While in the flowable state, the magnesium oxysulfate cement composition has a "flat" viscosity profile. A flat viscosity profile refers to a near-constant viscosity as a function of time. The flat viscosity profile enables the magnesium oxysulfate cement composition to remain flowable and to fill voids and block the fluid and gas flow preventing fluid and gas passage. This characteristic also allows reduced pump pressures during displacement which reduces stress on the wellbore formation.

Once the required magnesium oxysulfate cement composition temperature is reached, the flowable magnesium oxysulfate cement composition makes the near-immediate transition to the solid state. The flat viscosity profile suddenly changes with an extreme increase in viscosity as the cement composition hardens. The transition from the flowable state to the solid state is sufficiently sudden that there is no gel strength formation and no opportunity for formation of any channels and voids in the cement composition. The right-angle set typically occurs in less than 120 seconds, The hardened solid-state magnesium oxysulfate cement composition which is free of channels and voids, forms a barrier or plug which permanently blocks fluid and gas flow.

Magnesium oxysulfate cement compositions undergo the near-immediate transition from the flowable state to the solid state in a predictable manner because such cement compositions have a near-linear and predicable relationship between the temperature of the magnesium oxysulfate cement composition and the time required for the cement composition to form a solid-state mass.

Magnesium oxysulfate cement compositions of the types described herein are "non-invasive" in a production formation. By non-invasive it is meant that embodiments of the magnesium oxysulfate cement compositions can be formulated so that they will harden at approximately the wellbore face and will not flow significantly into the earthen formation or production zone. These cement compositions can be removed, if required, by complete dissolution in 15% hydrochloric acid (HCl).

This non-invasive characteristic is best explained by an analogy. The setting action of exothermic magnesium oxysulfate cement compositions is accelerated by heat. The magnesium oxysulfate cement compositions are a fluid when placed in the wellbore. In a production zone magnesium oxysulfate cement composition will flow into the formation. However, as the magnesium oxysulfate cement composition flows into the formation, the heat transfer per unit volume of fluid rises rapidly. This is analogous to standing a flowable column of a magnesium oxysulfate cement composition on a heat source. The composition will set from the portion of the column closest to the heat source. If the magnesium oxysulfate cement composition were spread out on the heat source, the transfer of heat per unit volume of the composition would be near-instantaneous.

The significance of this characteristic is that the magnesium oxysulfate cement compositions will be in a flowable state when pumped into the wellbore thereby providing time to place the cement composition at the desired location and to take further actions, such as removing the drill pipe after the displacement. At the interface of the magnesium oxysulfate cement composition and formation, the composition will set faster. The cement composition will not invade the formation beyond the wellbore periphery where the cement composition can be easily contacted and removed by use of a strong acid or can be perforated with a perforating tool. Accordingly, the magnesium oxysulfate cement composition has the ability to protect a production zone from damage that would otherwise result from drilling fluid, brine or cement composition infiltration into the production zone. For remedial and water shut-off operations using the magnesium oxysulfate cement composition, the time within which the cement composition hardens could be extended through use of an inhibitor, thereby allowing the cement composition to be "squeezed" into the formation.

As previously described, contributing to the non-invasive nature of the magnesium oxysulfate cement compositions is that such cement compositions can be formulated to completely dissolve when contacted by a solution having a strong acid concentration of about 15%. A 15% HCl solution is preferred. The cement compositions can be removed with the acid solution while leaving no solid-state residue in the production formation. This acid-solubility property makes magnesium oxysulfate cement compositions non-damaging to a producing formation because the compositions are capable of being removed if required. In embodiments where acid solubility is desired, the magnesium oxysulfate cement compositions should avoid inclusion of resins, polymers or non-acid soluble components.

Magnesium oxysulfate cement compositions are preferably prepared at the wellsite near the wellbore. Magnesium oxysulfate cement compositions may be prepared in a cement unit such as those manufactured by Halliburton, B. J. Hughes or Dowell Schlumberger. Typical cement units include a vessel and mixing apparatus. The constituents may be mixed in a batch or in a continuous mixing operation. The slurry may then be pumped directly from the cement unit to the wellbore.

An example of a batch formulation process may be practiced according to the following steps. In a first formulation step, a required quantity of fresh water is measured and delivered into a mixer. The mixer may have a 25 barrel (bbl) capacity with mechanically-actuated paddles. The water may be delivered to the mixer from a 100 bbl batch mixer used as a storage vessel.

In a second formulation step, magnesium chloride hexahydrate may optionally be added to the mixer and water if formulation of the magnesium oxysulfate cement compositions in brine is desired. The water and magnesium chloride hexahydrate are agitated for two minutes to ensure the magnesium chloride hexahydrate is fully in solution.

In a third formulation step, an admixture of magnesium oxide and magnesium sulfate trihydrate is added to the mixer and is agitated for two minutes to yield a homogenous flowable slurry. The slurry density may then be measured. The flowable slurry is ready for delivery to the wellbore following this step.

At any point of the process, optional additives, such as accelerator and/or inhibitor, can be added to the mixer. The optional additives may be pre-mixed in water or added directly to the mixer. An inhibitor may include a borate salt and an accelerator may include an anhydrous magnesium sulfate. Other additives include agents which lighten the slurry such as hollow silica beads and viscosity modifiers such as hydroxyethylcellulose (a high range water reducer and salt tolerant viscosifier). Other additives may include weighting agents such as barium sulfate or galena to increase the density.

The flowable slurry may optionally be pumped from the LS mixer to an intermediate bulk container (IBC).

The flowable slurry is next pumped from the LS mixer or from the IBC to the wellbore for use.

It is anticipated that magnesium oxysulfate cement compositions will be prepared at ambient temperature and pressure. Cooler temperatures may delay the ramp time to the internal composition temperature at which the compositions set to form a solid state material.

Referring to FIGS. 1-5, a method for preventing fluid and gas flow through a wellbore space defined by an inner casing and an outer casing which surrounds the inner casing is illustrated therein. The method can be implemented because the composition used to control the fluid and gas flow through the wellbore space has a rapid transition from a flowable state to a solid state with formation of little or no gel strength before the transition to form a barrier which blocks fluid and gas flow. The composition further has the near-linear relationship between the time required for the transition to occur and the composition temperature at which the transition occurs providing the user with predictability and control over timing of the transition. Magnesium oxysulfate cement compositions of the types described herein have these properties and form a plug or collar between the inner casing and the outer casing to provide a barrier which prevents fluid flow (e.g., oil and water) and gas flow between the casings. The method prevents uncontrolled leaking of subsurface fluids and gas between the casings and to the surface.

FIG. 1 schematically illustrates a type of problem solved by the novel method. FIG. 1 illustrates a well 1 which is drilled out of an earthen formation 3 using conventional drilling practices to form a wellbore 5 defined by well inner wall 7. The drilling produces a well opening at the surface (not shown) defining an opening of the wellbore 5. Inner wall 7 is also referred to as a "face" of well 1. During drilling of well 1, drilling fluid 9 is placed into wellbore 5 to provide a hydrostatic force which balances or counteracts any pressurized fluid and gas flow (collectively represented by reference number 11) from formation 3 and into wellbore 5 and blocks passage of fluid and gas past the slurry through well 1.

A surface casing 13 is driven into formation 3 to support wellbore inner wall 7 and prevent collapse of wellbore 5. Surface casing 13 is typically a hollow steel pipe having a generally cylindrical shape defining an interior space 15. In this example, surface casing 13 has a 28.5 inch inside diameter. Drilling fluid 9 left over from drilling of wellbore 5 at least partially fills interior space 15 of surface casing 13.

A surface, or outer, casing 13 terminates in a shoe 17 along distal end 19 of surface casing 13. Surface casing 13 and shoe 17 are set in place in wellbore 5 with a cement 21. The purpose of cement 21 is to provide a complete barrier to passage of fluids and gas 11 from formation 3 and into interior space 15 of surface casing 13 through shoe 17.

To extend well 1 further into formation 3, it is necessary to set an inner casing 23 within and extending beyond surface casing 13. Inner casing 23 is typically a hollow steel pipe having a generally cylindrical shape defining an interior space 25. In this example, inner casing 23 has a 24 inch inside diameter. Drilling fluid 9 left over from drilling of wellbore 5 may also fully or partially fill interior space 25 of inner casing 23. In the embodiment, inner casing 23 extends all the way to the surface (not shown) around the well 1 and extends beyond surface casing shoe 17 and distal end 19. In the example, inner casing 23 also terminates in a shoe 27 along distal end 29 of inner casing 23. Inner casing 23 and shoe 27 are also set in place in wellbore 5 with cement 21. The purpose of cement 21 is to provide a complete barrier to passage of fluids and gas 11 from formation 3 and into interior space 25 of inner casing 23 through shoe 27.

Figure 3:
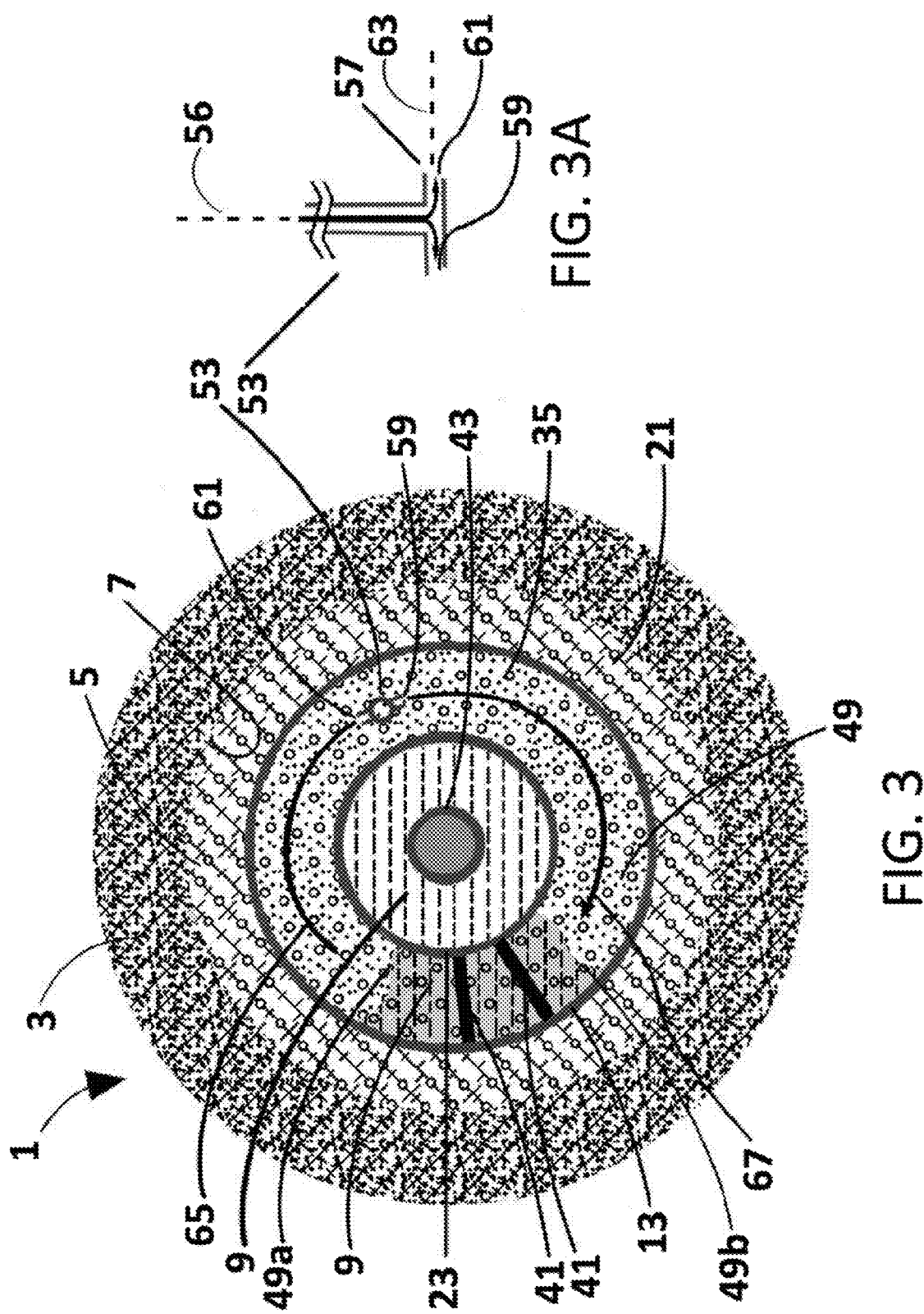
FIG. 3 is a section view taken along section 3-3 of FIG. 2 illustrating exemplary plural directional placement of a cement composition simultaneously in both clockwise and counter-clockwise directions between the inner casing and the surface casing.
Figure 4:
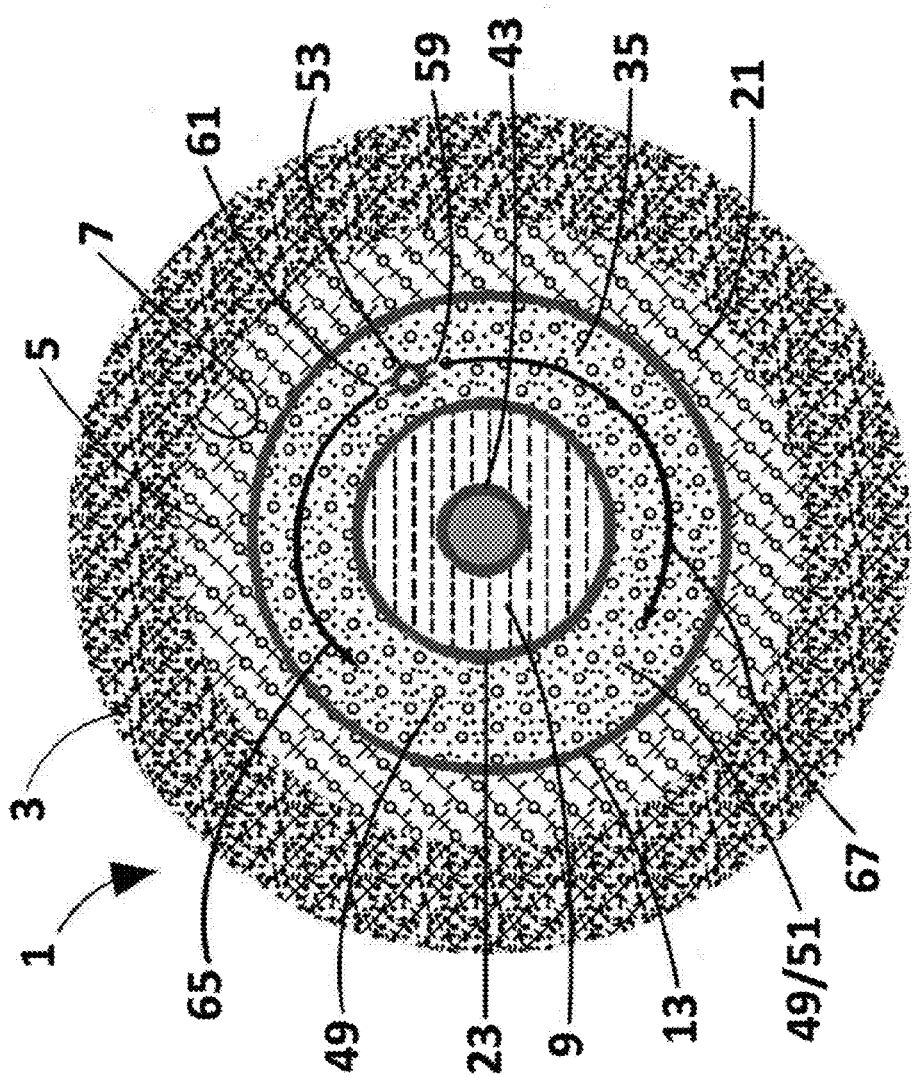
FIG. 4 is the section view of FIG. 3 but illustrating a solid-state cement composition plug or collar between the inner casing and the surface casing.

As illustrated in FIG. 1, surface casing 13 completely surrounds inner casing 23 in a region of overlap 33 between surface casing 13 and inner casing 23. In such region of overlap 33, surface casing 13 is an outer casing surrounding inner casing 23. A wellbore space 35 is defined by inner casing 23 and surface casing 13 which surrounds inner casing 23 in the region of overlap 33. Wellbore space 35 is frequently referred to as an "annulus" because of the ring-shape of the wellbore space 35 defined by cylindrical inner casing 23 and cylindrical surface casing 13 which is illustrated in the section views of FIGS. 3-4. Wellbore space 35 is not required to have an annular-shape in section such as illustrated in FIGS. 3-4. Wellbore space 35 could have a rectangular or other geometric shape. In the example, wellbore space 35 is around wellbore or casing axis 36 (FIGS. 2, 5).

In deep wells, the casing string extends beyond surface casing 13 and inner casing 23 and into the formation 3. As indicated in FIGS. 1-2 and 5, a further inner casing 37 extends well 1 further into formation 3. Inner casing 37 is set within inner casing 23. Inner casing 37 is typically a hollow steel pipe having a generally cylindrical shape defining an interior space. In this example, inner casing 37 has a 23 inch inside diameter. A further casing (not shown) extends from inner casing 37 and so forth. Each casing 23 and 37 has a region of overlap 39. Each successive casing decreases in diameter with increasing depth. Each successive casing 13, 23, 37 has a region of overlap (e.g., 33, 39) as described above with respect to region of overlap 33 and is a surface casing, or outer casing, with respect to the casing within the casing. Each successive casing also has a shoe at its distal end (e.g., 19, 29) as described previously with respect to shoes 17, 27.

Figure 2:
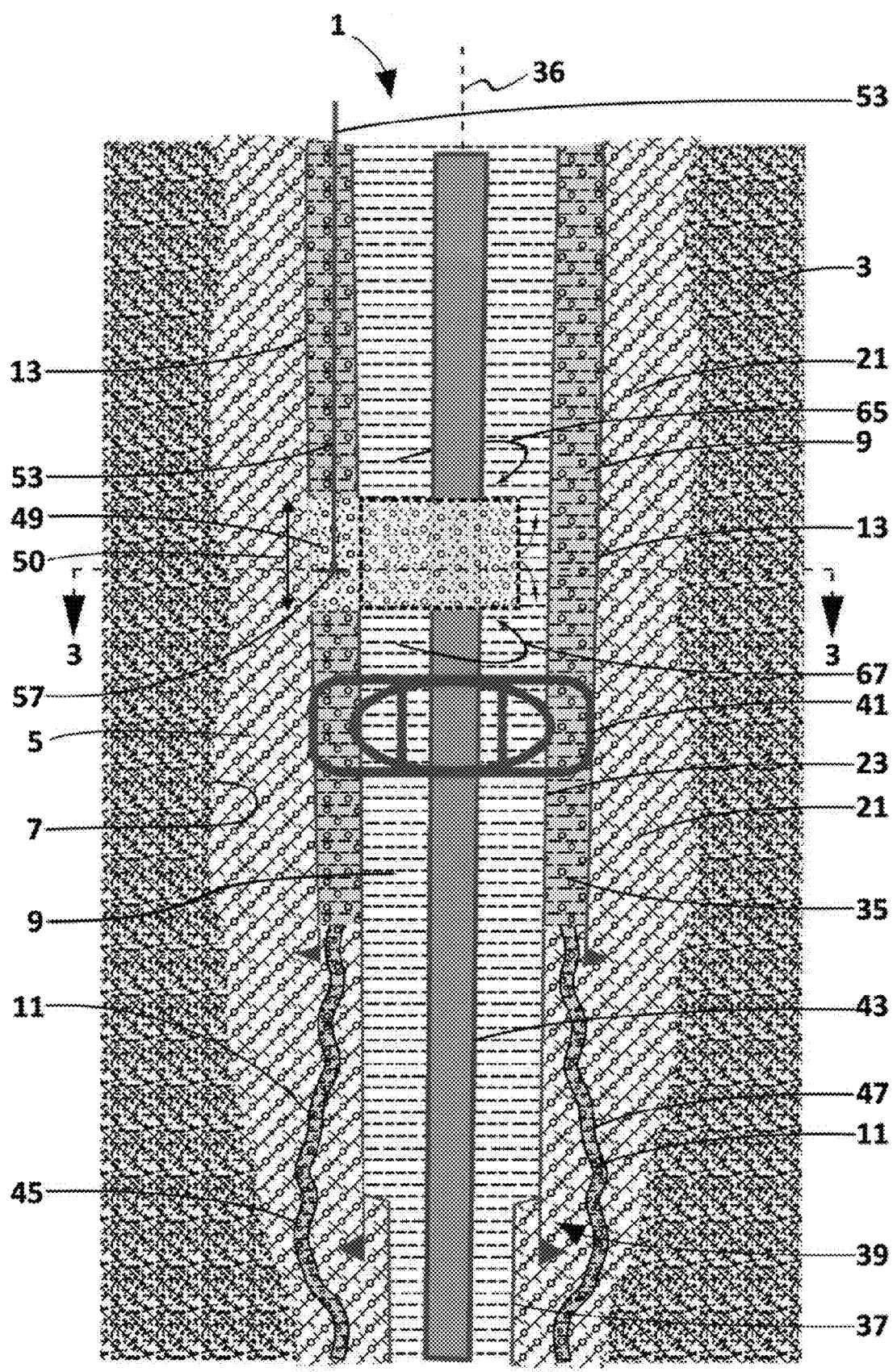
FIG. 2 is the schematic side elevation view of FIG. 1 illustrating an exemplary cement supply line and exemplary positioning of cement between the inner casing and the surface casing with certain hidden portions of the centralizer and cement composition slurry indicated by broken lines.
Figure 5:
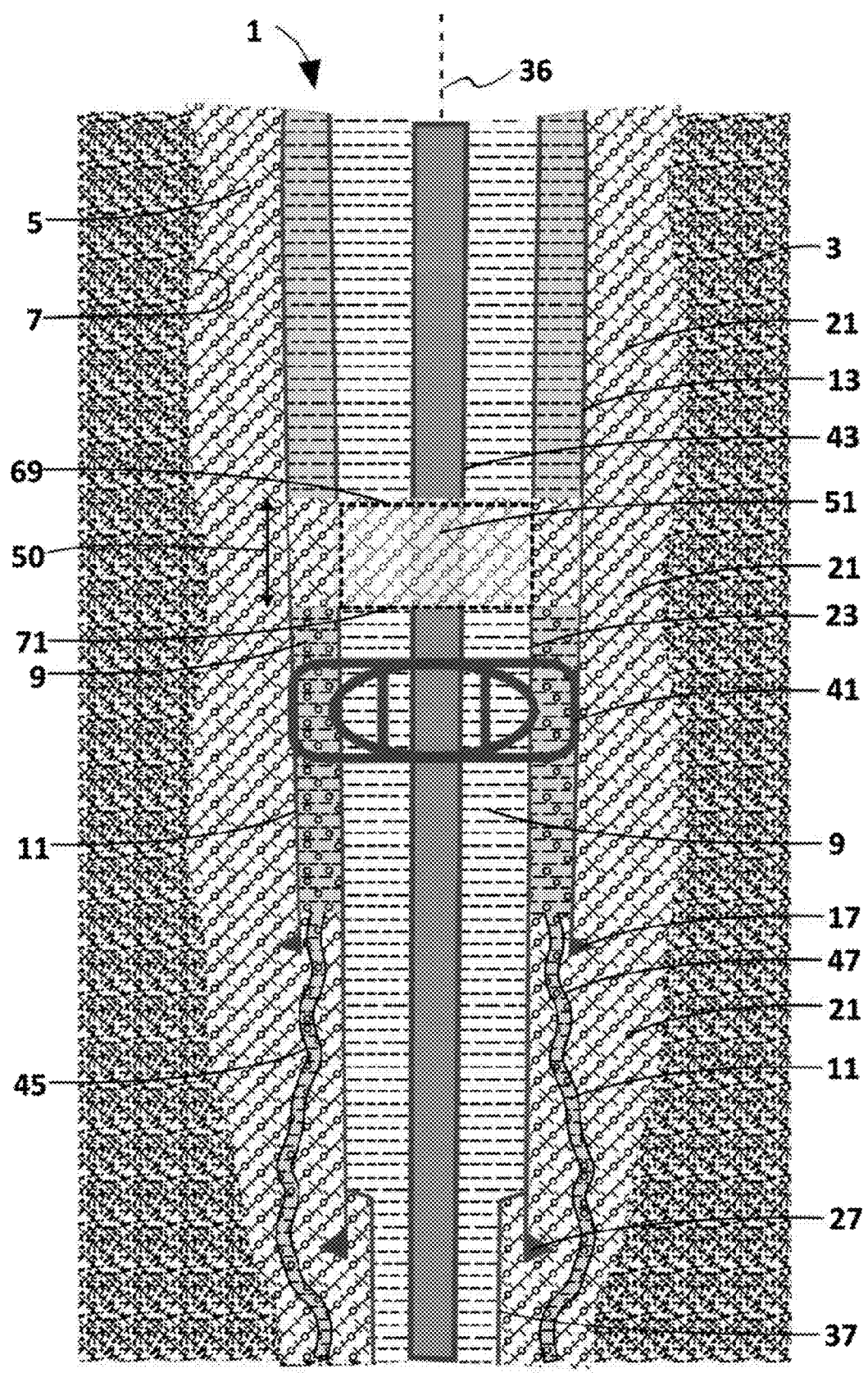
FIG. 5 is the schematic side elevation view of FIGS. 1-2 but illustrating the solid-state cement plug or collar between the inner casing and the surface casing with certain hidden portions of the centralizer and cement plug indicated by broken lines.

In the example illustrated in FIGS. 1-2 and 5, inner casing 23 is supported and centered within surface casing 13 by a centralizer 41. A centralizer 41 is a frame-like device that fits within a surface casing 13 and around an inner casing 23 within surface casing 13 and which centers and supports inner casing 23 within surface casing 13. As is known, a centralizer 41 typically consists of two halves jointed together by a hinge (not shown). Centralizers (e.g., centralizer 41) are made in various sizes to function with surface and inner casings 13, 23 of various sizes. The two halves of a centralizer 41 are hinged together on one sided and are placed around the exterior of the inner casing 23 and are fastened at the front by inserting a hinge pin (not shown) which holds the two halves of the centralizer 41 tight on the inner casing 23. When inner casing 23 is being run into the well 1 and surface casing 13, centralizers (e.g., centralizer 41) are placed at spaced apart intervals to keep inner casing 23 centrally located in the well 1. Because centralizers 41 are made like an open cage frame, the centralizers will not impede the flow of cement or fluids external to the inner casing 23.

In the example, drilling fluid 9 within interior space 15 of surface casing 13 and wellbore space 35 surrounds and passes through the frame-like structure of the centralizer 41. Also in the example, drilling fluid 9 extends between centralizer 41 and the surface opening (not shown) for the well 1, although the drilling fluid need not extend entirely to the surface opening.

Any number of centralizers 41 can be provided along the drill string. While a centralizer 41 is effective at centering and supporting an inner casing (e.g., casing 23 or 37) within the respective surface casing (e.g., surface casing 13 or casing 23 with respect to casing 37), the centralizer 41 also obstructs insertion of a supply line or pipe between surface and inner casings 13, 23 and past centralizer 41. This obstruction is disadvantageous for reasons described below.

A drill string 43 terminating in a bit (not shown) extends through each surface casing (e.g., surface casing 13) and inner casing (e.g., casings 23, 37) and into the production zone (not shown) of formation 3. Drill string 43 is not supported by centralizer 41 in the example.

As illustrated in FIGS. 1-3, well 1 may have some extent of uncontrolled passage of fluids and gas 11 between surface casing 13 and inner casing 23 and into and through wellbore space 35. FIGS. 1-2 and 5 illustrate that poor cementing practices or unstable geological formations can be one cause of uncontrolled passage of fluids and gas 11 into and through wellbore space 35. The shoes 17, 27 and cement composition 21 encasing shoes 17, 27 are a potential weak point where fluids and gas 11 can enter wellbore space 35 because of such poor cementing practices or unstable geological formations. For example, poor cementing practices for cement 21 encasing shoe 17, 27 can permit formation of channels 45, 47 to exist in cement 21, 31 after hardening. Fluids and gas 11 can migrate through such channels 45, 47 and into wellbore space 35. Unstable geological formations can cause cracks and fissures in cement 21, 31 encasing a shoe 17, 27. As with the channels 45, 47 previously described, fluids and gas 11 can migrate through such cracks and fissures and into wellbore space 35. Any fluid and gas 11 which enters wellbore space 35 can migrate through drilling fluid 9 within wellbore space 35 and to the surface at the well 1 site. FIGS. 1-3 illustrate the fluid and gas 11 migration problem.

Uncontrolled passage of fluids and gas 11 into and through wellbore space 35 can occur for other reasons not illustrated in FIGS. 1-3 and 5. One such reason is corrosion of surface casing 13 and formation of cracks and openings (not shown) in surface casing 13 resulting from the corrosion. Surface casing 13 can become corroded as a result of contact with subsurface water from formation 3. Pressurized fluids and gas 11 can pass from formation 3 and into surface casing 13 through such cracks and openings and into wellbore space 35.

Yet another source of uncontrolled passage of fluids and gas 11 into and through wellbore space 35 can include separation of two surface casings (e.g., casing 13) at a threaded joint which is sometimes used to connect two surface casings together. Fluids and gas 11 from formation 3 can enter the surface casing (e.g., casing 13) through the opening(s) provided by the separated and failed joint.

One solution to the problem of uncontrolled passage of fluid and gas 11 into and through wellbore space 35 would be to encase the source of the fluid and gas 11 infiltration in cement composition. However, it can be extremely difficult or impossible to place cement at the source of the fluid and gas 11 infiltration because any centralizer 41 within surface casing 13 would potentially obstruct and prevent passage of a supply line, coiled tubing or drill pipe to reach the source of the infiltration. Coiled tubing for delivery of cement is particularly prone to blockage by obstructions such as centralizer 41.

FIGS. 2-5 illustrate an exemplary method for preventing fluid and gas 11 flow through wellbore space 35. In the embodiment, cement composition 49 may be placed between centralizer 41 and the surface around well 1 thus avoiding any obstruction provided by centralizer 41 with respect to placement of cement composition 49 beyond centralizer 41. Also in the embodiment, cement composition 49 injected into wellbore 5 flows in plural directions, (bi-directionally in the example) and laterally simultaneously in both clockwise and counterclockwise (i.e., opposite) directions around wellbore space 35. Cement composition 49 completely fills wellbore space 35 axial region 50 to form a solid-state plug 51 between surface casing 13 and inner casing 23 which prevents fluid and gas 11 flow through wellbore 35 stopping any and all leaks between surface casing 13 and inner casing 23.

In a preferred but non-essential first step of the exemplary method, a temperature probe (not shown) is extended into well 1 adjacent a centralizer 41 adjacent to which cement composition 49 will be placed and a temperature reading of the environmental temperature in the wellbore 5 is taken. The purpose of the temperature reading is to assist with selection of cement composition 49 constituents having an operational range which overlaps with the environmental temperature.

According to a second step of the exemplary method, a cement composition 49 having the capability of a right-angle set from the flowable state to the solid state is provided and is prepared and made ready for use in wellbore 1 annular space 25. The second step can occur before, during or after the temperature reading step. Magnesium oxysulfate cement compositions of the type described herein are highly preferred as a cement composition 49 for use in practicing the method. As part of the second step, the cement composition 49 may be formulated to have a specific gravity and a viscosity which are slightly greater, the same as, or about the same as, drilling fluid 9. Because of the right-angle set with no gel strength generation, cement composition 49 can be pumped and will flow laterally around wellbore space 35 as described below.

In a third step of the exemplary method, the user determines the specific gravity and, optionally, the viscosity of any drilling fluid 9, or other fluid filling wellbore space 35 and surrounding centralizer 41. A collector probe (not shown) is extended into well 1 proximate centralizer 41 adjacent to where cement composition 49 will be placed and a sample of drilling fluid 9 or other fluid is taken and brought to the surface for testing to determine the specific gravity and viscosity if desired. The third step can occur before, during or after the temperature reading and preparing steps. The purpose of determining the specific gravity and viscosity of the drilling fluid 9 or other fluid is to set, or adjust, the specific gravity of cement composition 49 so that cement composition 49 has a specific gravity which is slightly greater than, or approximately the same as, drilling fluid 9 or other fluid in wellbore space 35. The specific gravity of cement composition 49 can be adjusted by adding weighting agents such as barite or galena (to increase specific gravity) or hollow silica beads (to decrease specific gravity and add volume).

By way of example, if drilling fluid 9 had a specific gravity (SG) of 1.45, cement composition 49 could be adjusted to have an SG of about 1.45. By setting the specific gravity of cement composition 49 to be approximately the same as that of drilling fluid 9, axial flow of cement slurry along wellbore or casing axis 36 is minimal and plug 51 is formed in an axially-compact manner. The viscosity of cement composition 49 is preferably adjusted to be slightly greater than the viscosity of drilling fluid 9 or other fluid so that cement composition 49 will laterally displace the drilling fluid 9 or other fluid when injected into wellbore 5. In the example, cement composition 49 having an SG about the same as the drilling fluid 9 SG will essentially float on drilling fluid 9 limiting axial flow toward a distal end of well 1 and with gravity providing a force that limits axial flow toward the well 1 surface opening so that cement composition 49 flows around wellbore space 35 with minimal axial flow.

According to a fourth step of the exemplary method, a cement supply line 53 is provided. As illustrated in FIG. 3A, an example of a supply line 53 may be a tube having an axis 56 and terminating in an inverted T-shaped end portion 57. The tube and inverted T-shaped portion 57 are preferably made of steel, are cylindrical and have a 1 inch inside diameter. In the example, inverted T-shaped portion 57 preferably includes a plurality of outlets 59, 61 which are along an axis 63 orthogonal to supply line 53 axis 56. The purpose of outlets 59, 61 is to simultaneously provide plural-directional (e.g., bi-directional) output of pressurized cement composition 49 slurry in both clockwise and counter clockwise directions in the directions of arrows 65, 67 (FIG. 3) generally orthogonal to wellbore or casing axis 36 around wellbore space 35 forming plug 51 or collar between surface casing 13 and inner casing 23 after the cement composition 49 transitions from the flowable state to the solid state.

Persons of skill in the art will appreciate that other types of supply lines may be utilized. More than one supply line 53 may be utilized. Outlets 59, 61 should face generally away from each other, but need not be on the same axis 63. More than two outlets 59, 61 may be utilized.

Referring to FIG. 2, in a fifth step of the method, supply line 53 is placed or positioned into or within wellbore space 35. Preferably, outlets 59, 61 are spaced from (e.g., above) centralizer 41. The T-shaped end 57 and outlets 59, 61 are submerged in the drilling fluid 9 in the example. In the example, outlets 59, 61 provide for bi-directional and lateral flow of cement composition 49 away from supply line 53.

Referring next to the section view of FIG. 3, in a final step of the exemplary method, cement composition 49 capable of a right-angle set is injected into wellbore space 35 through supply line 53 and the at least two lateral outlets 59, 61. In the example, cement composition 49 flows out through outlets 59, 61 such that cement composition 49 simultaneously flows bi-directionally and laterally through and within drilling fluid 9 (i.e., substantially orthogonal to axis 36) with cement composition leading surfaces 49a, 49b in both clockwise and counterclockwise directions as indicated by arrows 65, 67. Cement composition 49 flows around wellbore space 35 to completely fill an axial region 50 of wellbore space 35. It is anticipated that cement composition 49 will have a minimal amount of axial flow and that certain portions of the cement composition 49 flow will be toward surface and distal ends of well 1 and thus not be completely orthogonal to axis 36. Because cement composition 49 (e.g., magnesium oxysulfate cement composition) is formulated to have about the same specific gravity as drilling fluid 9, such cement composition 49 flows generally around wellbore space 35 to fill axial region 50 of wellbore space 35. Cement composition 49 has minimal axial flow along axis 36 within surface casing 13. Cement composition 49 displaces drilling fluid 9 as cement composition 49 flows to thereby form a plug 51 or collar which is axially compact as illustrated in the example of FIGS. 4-5. The axially-compact plug 51 completely fills axial region 50 of wellbore space 35 between surface casing 13 and inner casing 23 adjacent centralizer 41.

While in the flowable state, the hydrostatic force provided by cement composition 49 prevents fluid and gas 11 flow through wellbore space 35. Cement composition 49 transitions in a near-immediate manner, for example 120 seconds, from the flowable state to the solid state avoiding formation of gel strengths and the resultant channels (e.g., channels 45, 47) as previously described. Once hardened and in the solid state, plug 51 provides a barrier which prevents fluid and gas flow through wellbore 5 and wellbore space 35.

Plug 51 formed by cement composition 49 may be irregular and even jagged along first and second surfaces 69, 71 which are facing one of the distal or surface ends of well 1 (FIG. 5). What is important is that cement composition 49 flow completely around wellbore space 35 to block fluid and gas flow through wellbore space 35. Axial flow of cement composition 49 is minimal in the sense that cement composition 49 fills axial region 50 of wellbore space 35 sufficiently to block fluid and gas flow through wellbore space 35. Because an axial region 50 of wellbore space 35 is filled with cement composition 49, it is unnecessary to completely fill all of wellbore space 35. Axial flow of cement composition 49 would be expected to vary depending on factors such as the volumetric amount of cement composition 49 displaced through supply line 53 and the available amount of volumetric wellbore space 35 adjacent end 57 of supply line 53. Axial flow could be 1 meter in one application or 3 meters in another application and in either application the resultant plug 51 would block fluid and gas flow through wellbore space 35.

The method may be practiced in wells 1 having any orientation. Well 1 may be vertical as illustrated in FIGS. 1-5, horizontal, angled or a combination of orientations. Axial flow of cement composition 49 and axial region 50 may be affected by gravity in wells 1 that are other than vertical.

The exemplary method described above relies on the predictable setting characteristics of cement composition 49 together with the method of placement as described. The method has many applications in remedial applications to prevent unwanted movement of fluids and gas.

Methods of preventing fluid and gas flow through a wellbore space 35 defined by inner and outer casings 13, 23 can be implanted in settings other than those previously described. For example, there may be a situation in which the level of wellbore drilling fluid 9 may be within wellbore space 35 between inner and outer casings 13, 23 but "below" centralizer 41 in wellbore space 35. In other words, drilling fluid 9 would be between centralizer 41 and a distal end (now shown) of well 1. Centralizer 41 may not be immersed in drilling fluid 9 in such a situation. In this situation, the cement composition 49 would be formulated to have a considerably higher density (i.e., specific gravity) than drilling fluid 9. The cement composition 49 would be displaced in the same manner as previously described by a supply line such as supply line 53 (straight or coiled) but preferably with a single axial opening (not shown) aligned with a supply line axis such as axis 56. The supply line is preferably positioned just above centralizer 41 and between cenralizer 41 and the surface opening (not shown) of well 1. The cement composition 49 would be discharged from the preferred single outlet of the supply line.

The cement composition 49 flows down into the well 1 along one side of the well 1 because cement composition 49 is formulated to be heavier than drilling fluid 9. Once cement composition 49 reaches shoe 17 of well 1, it flows completely around wellbore space 35 generally orthogonal to a wellbore or casing axis such as axis 36. Cement composition 49 forms a plug, such a plug 51, completely around wellbore space 35 filling an axial region such as axial region 50 to prevent fluid and gas flow past the plug. In the process, flow of cement composition 49 displaces drilling fluid 9 away from cement composition 49.

If any oil from formation 3 is in wellbore space 35, magnesium oxysulfate cement compositions will not mix with such oil and will transit down through any such oil to shoe 17 for the subsequent transition from the flowable state to the solid state for formation of a barrier to the fluid and gas flow. Preferably, magnesium oxysulfate cement compositions used in such a method are formulated with a brine composition of the types described herein.

Figure 6:
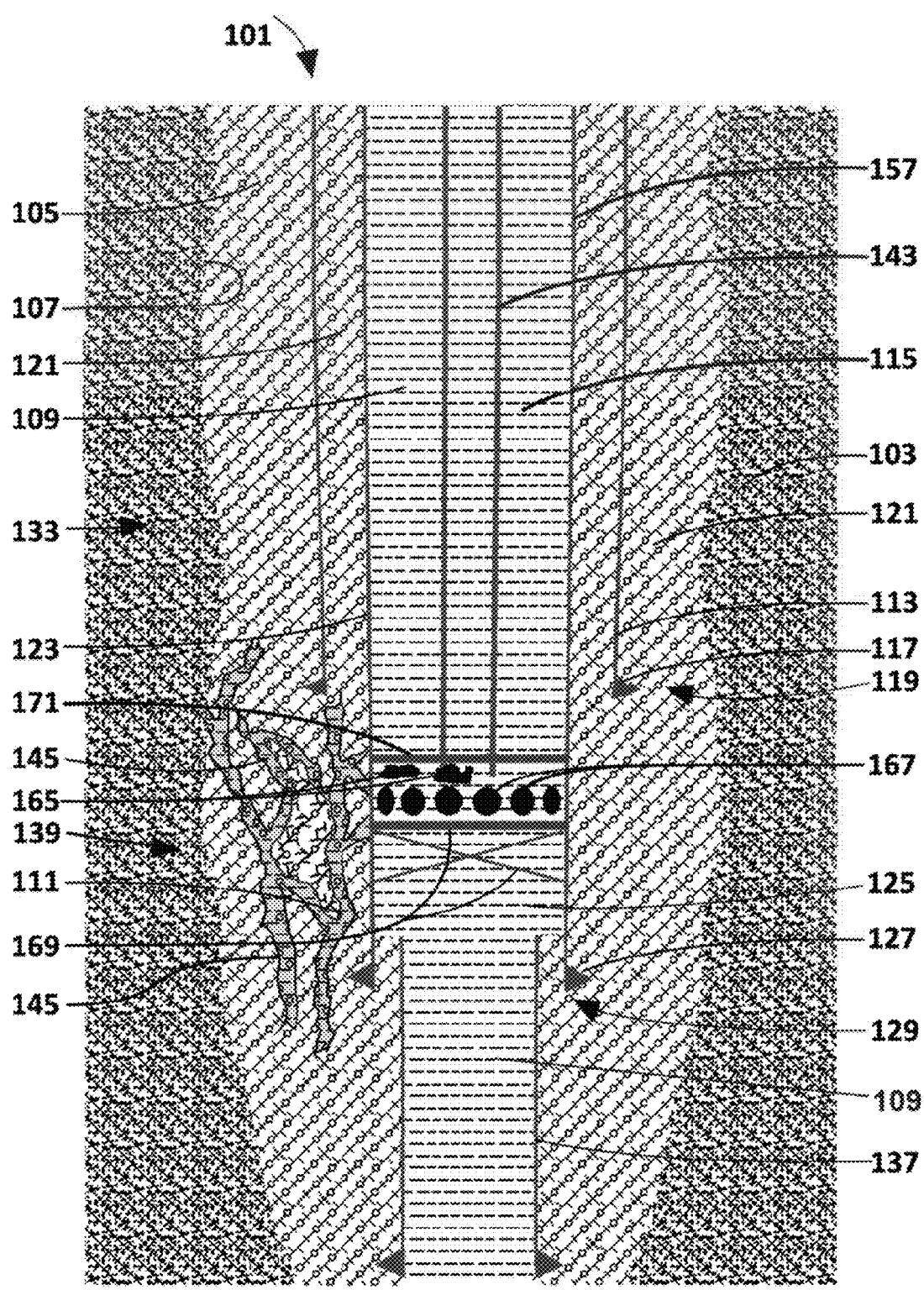
FIG. 6 is a schematic side elevation view of a further wellbore illustrating an exemplary squeeze operation in which an exemplary cement composition is forced into the formation.
Figure 7:
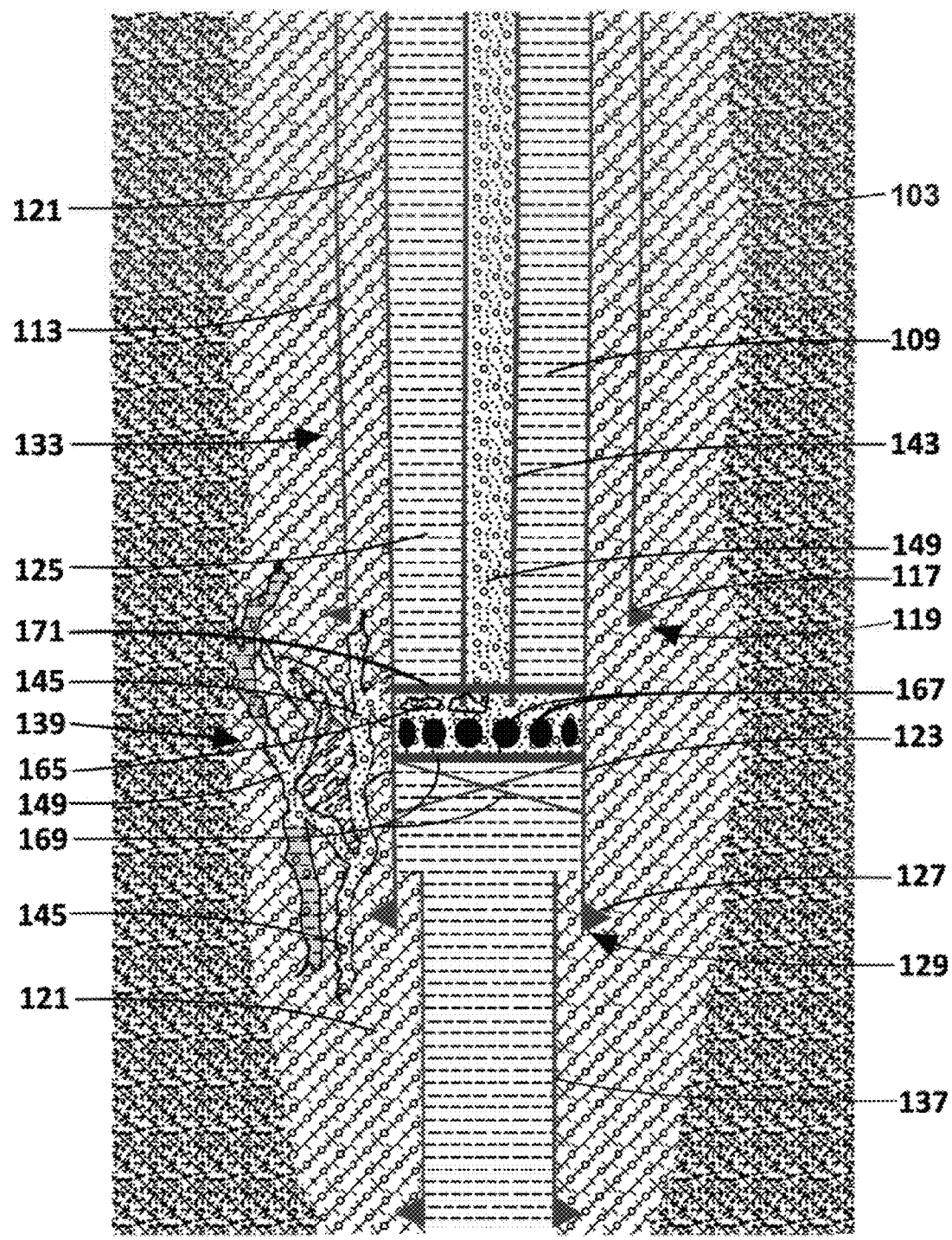
FIG. 7 is the schematic side elevation view of FIG. 6 further illustrating the exemplary squeeze operation in which exemplary cement composition is forced into the formation.

Referring next to FIGS. 6-7, a further application of magnesium oxysulfate cement compositions of the types described herein comprises use in a method of wellbore 105 remediation or workover, for example to close openings in a casing caused by a leak or by casing corrosion 165 in the casing. In one example of a method, magnesium oxysulfate cement compositions 149 of the types described herein may be injected through inner casing 123 and into cement 121 or earthen formation 103 surrounding casing 123, to fill channels 145 in cement 121 or channels and voids (not shown) in the earthen formation 103. Such magnesium oxysulfate cement compositions 149 hardened to provide a barrier which prevents fluid flow (e.g., oil and water) and gas flow from the earthen formation 103 and into inner casing 123. The method prevents uncontrolled leaking of subsurface fluids and gas through surface and inner casings 113, 123 and well 101 and to the surface at the wellsite. The method may be applied to control fluid and gas flow in any type of casing; reference to inner casing 123 is merely exemplary.

Referring then to FIGS. 6-7, those figures schematically illustrate a type of problem solved by the novel application of the magnesium oxysulfate cement composition 149. FIGS. 6-7 illustrate a well 101 which shares certain similarities with well 1 described in conjunction with FIGS. 1-5. Well 101 is drilled out of an earthen formation 103 using conventional drilling practices to form a wellbore 105 defined by well inner wall 107. Inner wall 107 is also referred to as a "face" of well 101. During drilling of well 101, drilling fluid 109 is placed into wellbore 105 to provide a hydrostatic force which balances or counteracts any pressurized fluid and gas flow (collectively represented by reference number 111) from formation 103 and into wellbore 105.

A surface casing 113 is driven into formation 103 to support wellbore inner wall 107 and prevent collapse of wellbore 105. Surface casing 113 is typically a hollow steel pipe having a generally cylindrical shape defining an interior space 115. In this example, surface casing 113 has a 30 inch inside diameter. In the example, surface casing 113 terminates in a shoe 117 along distal end 119 of surface casing 113. Surface casing 113 and shoe 117 are set in place in wellbore 105 with cement 121. Cement 121 may partially fill interior space 115 of surface casing 113. The purpose of cement 121 is to provide a complete barrier to passage of fluids and gas 111 from formation 103 and into interior space 115 of surface casing 113 through shoe 117.

In the example, cement 121 at least partially fills surface casing 113. The cement 121 is drilled out to provide a bore 157 in which inner casing 123 extends beyond surface casing 113 to extend well 101 further into formation 103. Inner casing 123 may be a hollow steel pipe having a generally cylindrical shape defining an interior space 125. In this example, inner casing 123 has a 24 inch inside diameter.

Inner casing 123 terminates in a shoe 127 along distal end 129 of inner casing 123 as represented schematically in FIGS. 6-7. Inner casing 123 and shoe 127 are set in place in wellbore 105 with cement 121. The purpose of cement 121 is, as previously stated, to provide a complete barrier to passage of fluids and gas 111 from formation 103 and into interior space 125 of inner casing 123 through shoe 127. In the example, inner casing 123 is at least partially filled with the drilling fluid 109 remaining from drilling of wellbore 105.

As illustrated in FIGS. 6-7, surface casing 113 completely surrounds inner casing 123 in a region of overlap 133 between surface casing 113 and inner casing 123. In such region of overlap 133, surface casing 113 is an outer casing surrounding inner casing 123.

In deep wells, the casing string extends past surface casing 113 and inner casing 123 and into the formation 103. As indicated in FIGS. 6-7, a further inner casing 137 extends well 101 further into formation 103. Inner casing 137 is set within inner casing 123. Inner casing 137 is typically a hollow steel pipe having a generally cylindrical shape defining an interior space. In this example, inner casing 137 has a 17.5 inch inside diameter. Inner casing 137 is at least partially filled with the drilling fluid 109 in the example.

A further casing (not shown) extends from inner casing 137, and so forth. Each casing 123 and 137 has a region of overlap. Each successive casing decreases in diameter with increasing depth. Each successive casing 113, 123, 137 has a region of overlap (e.g., 133, 139) as described above with respect to region of overlap 133 and is a surface casing, or outer casing, with respect to the casing within the casing. Each successive casing also has a shoe at its distal end (e.g., 119, 129) as described previously with respect to shoes 117, 127.

In an optional first step of a method, a wire line (not shown) may be run through drilling fluid 109 within inner casing 123 to determine the location of the leak or corrosion 165 of inner casing 123 and to establish the environmental or ambient temperature of earthen formation 105 at the location of the leak or corrosion 165.

In a next step of the method, a "radial" perforation consisting of spaced apart holes 167 located around inner casing 123 may be made in inner casing 123. For convenience and brevity, only certain of the holes illustrated in FIGS. 6-7 are indicated by number 167. Holes 167 may be made fully or partially around inner casing 123. It will be understood that inner casing 123 is merely exemplary and holes 167 could be made in a surface casing 113 or other suitable casing. The purpose of the radial perforation is to provide openings in inner casing 123 through which magnesium oxysulfate cement composition 149 can be injected through inner casing 123. Holes 167 comprising the radial perforation may be made entirely through inner casing 123 with a gun (not shown) placed within inner casing 123 at the location of the leak or corrosion 165.

In a next step of the method, a packer 169 is run into well 101 and is "set" within inner casing 123 beyond the location of the leak or corrosion 165 and beyond the radial perforation. Packer 169 is a three-dimensional plug which radially fills interior space 125 of inner casing to seal off wellbore 105 and form a barrier to fluid flow beyond packer 169. Packer 169 may be of any suitable type including an inflatable packer or a packer designed to be drilled out following completion of the remedial operation.

In a next step of the method, a retainer 171 is "strung" into well 101 and is "set" within inner casing 123 before the location of the leak or corrosion 165 and before the radial perforation comprising holes 167. Like packer 169, retainer 171 is a three-dimensional plug which radially fills interior space 125 of inner casing 123 to seal off wellbore 105 and form a barrier to fluid flow beyond retainer 171. Retainer 171 may be of any suitable type including an inflatable retainer, or a retainer designed to be drilled out following completion of the remedial operation.

Together, packer 169 and retainer 171 isolate inner casing 123 inner space 125 surrounding the location of the leak or corrosion 165. Retainer 171 allows access into the inner space 125 between packer 169 and retainer 171 through drill pipe 143, tubing or, coiled tubing if used.

In an optional next step, a "leak-off" is preferably performed with water to ascertain what volume and at what pressure water can be pumped through drill string 143 extending through retainer 171 into the formation external of the inner casing 123 between packer 169 and retainer 171. The water flows through holes 167 and into formation 103. This data provides a base line for a flow rate and pressure and pump rate when displacing the magnesium oxysulfate cement composition 149. In addition the approximate temperature must be known. In old wells, this may necessitate the running of a wireline temperature survey. The volume of magnesium oxysulfate cement composition 149 can then be calculated. The volume of the interior space 125 between the packer 169 and retainer 171 is known as is the flow rate of the water and pump pressure. This provides a base line for the volumetric amount of magnesium oxysulfate cement composition 149 required and the rate at which it can be displaced. Since the environmental temperature of the well 101 is known, it is possible to determine the amount of time at which the magnesium oxysulfate cement composition 149 will transition from the flowable to the solid state. The operator need only confirm that the required volume of magnesium oxysulfate cement composition 149 can be delivered within the available time before the transition from flowable to solid state. When this transition occurs it is desirable to have a small amount of the composition which is still being squeezed under pressure. At the transition there will be a very rapid rise in pump pressure which tells the operator the transition has occurred.

Drill string 143 may remain in place through retainer 171 for subsequent delivery of magnesium oxysulfate cement composition 149 as will next be described.

In a next step, magnesium oxysulfate cement composition 149 can be prepared as described previously.

Next and as illustrated in FIG. 7, a volume of magnesium oxysulfate cement composition 149 calculated based on the leak off step can next be pumped in flowable slurry form through drill pipe 143 into the isolated space between packer 169 and retainer 171 and to the location of the leak or corrosion 165. The volume of magnesium oxysulfate cement composition 149 is preferably greater than the volume of the isolated inner space 125 between packer 169 and retainer 171 to allow for magnesium oxysulfate cement composition 149 to pass through the leak or corrosion 165 and holes 167 and into channels 145 as illustrated in FIG. 7. After placement within the isolated inner space 125 between packer 169 and retainer 171, the magnesium oxysulfate cement composition 149 is slowly pumped away into the leak or corrosion 165 and into channels 145. This process is known as a "squeeze" operation.

The unique right-angle set of the magnesium oxysulfate cement composition 149 means that absolute engineering control can be applied to the squeeze operation because the time duration in which the magnesium oxysulfate cement composition 149 will transition from a flowable state to a solid state can always be determined for any given environmental or ambient temperature of the wellbore 105. Because the volume of needed magnesium oxysulfate cement composition 149 is known from the leak off step and the time duration available to place the magnesium oxysulfate cement composition 149 can be calculated, the correct volumetric amount of magnesium oxysulfate cement composition 149 can always be "squeezed" or pumped behind casing 123 through the leak or corrosion 165 and into channels 145. Once hardened within channels 145, magnesium oxysulfate cement composition 149 forms a barrier which fills and seals the formation and fills and seals any leak or corrosion 165 in inner casing 123 thereby and preventing fluid and gas 111 from entering inner casing 123. This hardening of the magnesium oxysulfate cement composition 149 is indicated by a rapid increase in the pump pressure informing the user that no further magnesium oxysulfate cement composition is required.

In a final step, packer 169 and retainer 171 can be drilled out and removed with a drill (not shown) attached to drill pipe 143 to return well 101 to service.

The time duration within which the magnesium oxysulfate cement composition 149 will transition from a flowable state to a solid state can be increased by the addition of an inhibitor or decreased by addition of an accelerator. Combinations of inhibitors and accelerators can be utilized to provide a further degree of control over the time duration for the transition.

Magnesium oxysulfate cement compositions 149 of the type described herein, are affected by the ambient or environmental temperature of wellbore 105. The greater the ambient temperature of the wellbore 105, the faster the magnesium oxysulfate cement composition 149 will transition to the solid state. However, in subzero Arctic conditions where there is no external heat source, magnesium oxysulfate cement compositions 149 can be formulated to produce its own heat of hydration sufficient to counter the low ambient temperatures and to produce the right-angle set. Magnesium oxysulfate cement compositions 149 may also be formulated using heated water if required. Compositions of the types described herein are versatile and can be used in many different environmental conditions.

EXAMPLES

The following examples illustrate certain characteristics of magnesium oxysulfate cement compositions. Exemplary methods of use are also illustrated. The setting properties of magnesium oxysulfate cement compositions and the transition from flowable to solid state were evaluated under various environmental conditions and in combination with additives, such as inhibitors and accelerators.

Examples 1-3

Examples 1-3 demonstrate that the magnesium oxysulfate cement compositions undergo a predictable transition from a flowable state to a solid state with a near-immediate transition from the flowable state to the solid state (i.e., a right-angle set). The embodiments of Examples 1-3 represent magnesium oxysulfate cement compositions with an operational range of about 70° C. to about 130° C. and in this embodiment the transition occurs when the cement reaches an internal temperature of about 72° C.

Examples 1-3 were prepared according to the formulation of Table 1:

TABLE 1

| | Constituent | Amount | Weight Percent |
|---|---|---|---|
| 1 | Fresh Water | 300 g (300 ml) | 22.2% |
| 2 | Magnesium chloride | 450 g | 33.3% |

TABLE 1-continued

| | Constituent | Amount | Weight Percent |
|---|---|---|---|
| 3 | Magnesium oxide Magchem 10 MgO | 300 g | 22.2% |
| 4 | Magnesium oxysulfate trihydrate | 300 g | 22.2% |
| | Total | 1350 g | 100% |

For each example, a brine solution was prepared by admixture of the 300 g of water and 450 g of magnesium chloride ($MgCl_2.6H_2O$). The water and magnesium chloride were mixed for approximately 2 minutes. The mixing was stopped when the salt was observed to be in solution.

Next, 300 g of Magchem 10 magnesium oxide and 300 g of magnesium oxysulfate powder was admixed with the brine for approximately 5 minutes to form the base formulation slurry. The magnesium chloride salt brine and magnesium oxide powder reacted forming a magnesium oxysulfate cement slurry. The slurry was observed to be flowable with a fluid density of about 13.5 ppg (1.68 SG).

Batches of each magnesium oxysulfate cement composition of Examples 1-3 were prepared as described above to evaluate their respective setting properties under simulated temperature and pressure conditions typical of those in a wellbore. A Chandler Engineering pressurized full sized cement consistometer was used for this evaluation. The Chandler consistometer determined the viscosity by measuring the resistance to movement of a rotatable paddle positioned in the sample. The consistometer was equipped with a digital temperature display which provided the internal temperature of the sample composition as measured by a probe positioned in the composition. Visual observations of the composition temperature were made in each example. In each example, a 1350 g sample of the slurry was placed in a consistometer cup. The cup was placed into an oil bath within the consistometer chamber.

For each sample run, the consistometer was set to linearly increase the consistometer temperature to 95° C. (Example 1) or 90° C. (Examples 2-3). The ramp time and set time for each of the three batches of Example 1 is indicated in Table 2. The ramp time of Example 2 was 25 minutes. In all cases the pressure was linearly ramped at the same rate as the ramp time to 4000 psi. The ramp simulates the time needed to displace or deliver the flowable magnesium oxysulfate cement composition to the wellbore location at which the cement composition is to be placed. In an actual wellbore use, the cement composition would approach the wellbore temperature during the displacement and this is what is simulated by the ramp.

TABLE 2

| | Example 1 | |
|---|---|---|
| Batch | Ramp (Min) | Set Time (Minutes) |
| 1 | 15 | 2 |
| 2 | 35 | 20 |
| 3 | 60 | 40 |

Figure 8:
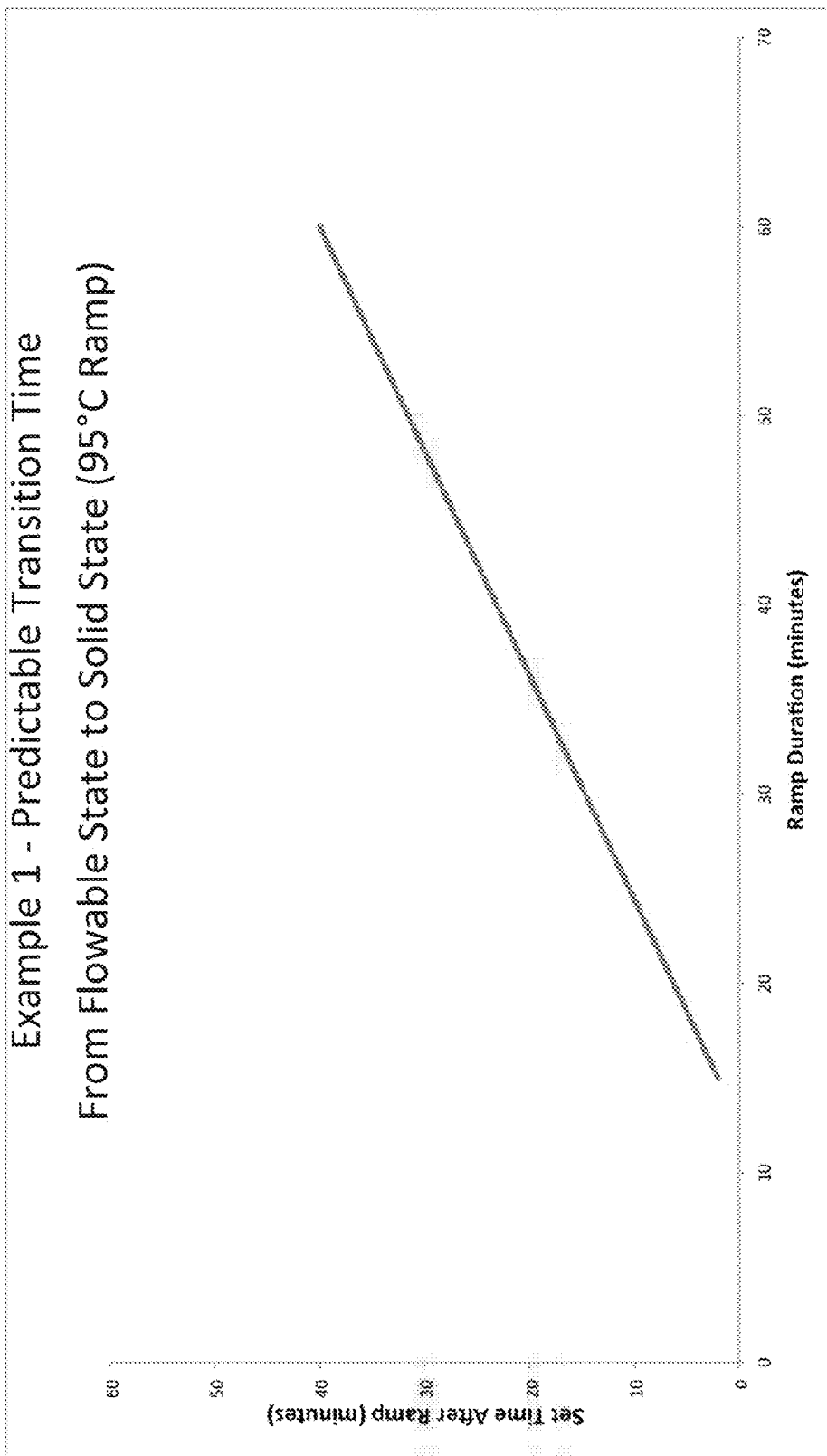
FIG. 8 is a graph showing setting properties of cement compositions according to Example 1.

Table 2 and FIG. 8 illustrate the times at which the cement composition embodiments of Example 1 transitioned from flowable slurry to a solid state. This is the set time in Table 2. As illustrated in Table 2 and FIG. 8, each exemplary magnesium oxysulfate cement composition had a predictable near-linear relationship between the time to transition from flowable slurry to the solid state and the cement composition temperature at which the transition occurs. The faster the cement composition temperature approaches the environmental or ambient temperature, the more rapidly the cement composition undergoes the transition from the flowable state to the solid state. The cement composition temperature at which the cement composition of Example 1 made the transition from flowable slurry to solid state was observed to be about 72° C. The linearity of the time for the cement compositions to set enables the user to predict when the cement composition will harden providing sufficient time to deliver the cement composition to the location where the cement composition is to be placed.

Figure 9:
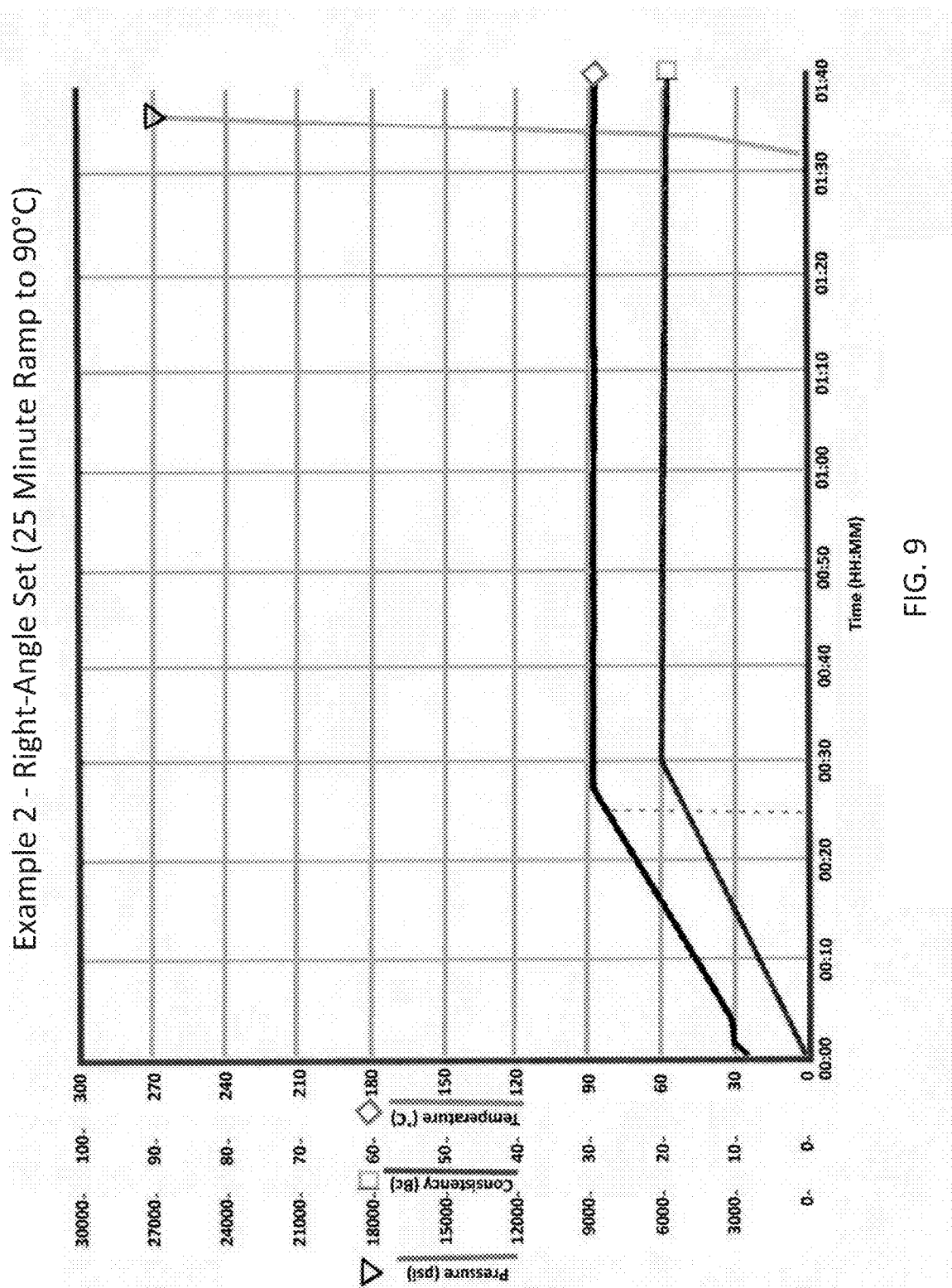
FIG. 9 is a graph showing setting properties of the cement composition of Example 2.

FIG. 9 demonstrate that the unmodified magnesium oxysulfate cement composition of Example 2 rapidly transitions from a flowable state to a solid state. The near-immediate transition from flowable state to solid state has little or no gel strength before the transition. The lack of gel strength avoids formation of channels and voids in the cement composition which could allow fluids and gas to pass through the cement composition even after the cement composition had hardened. FIG. 9 demonstrates that the phase transition is sudden and near-immediate occurring in less than 120 seconds. The shape of the curve in FIG. 9 is indicative of the right-angle set characteristic of compositions of the invention. At the time of transition from flowable state to solid state, the temperature of the composition of Example 2 was observed to be about 72° C.

Figure 10:
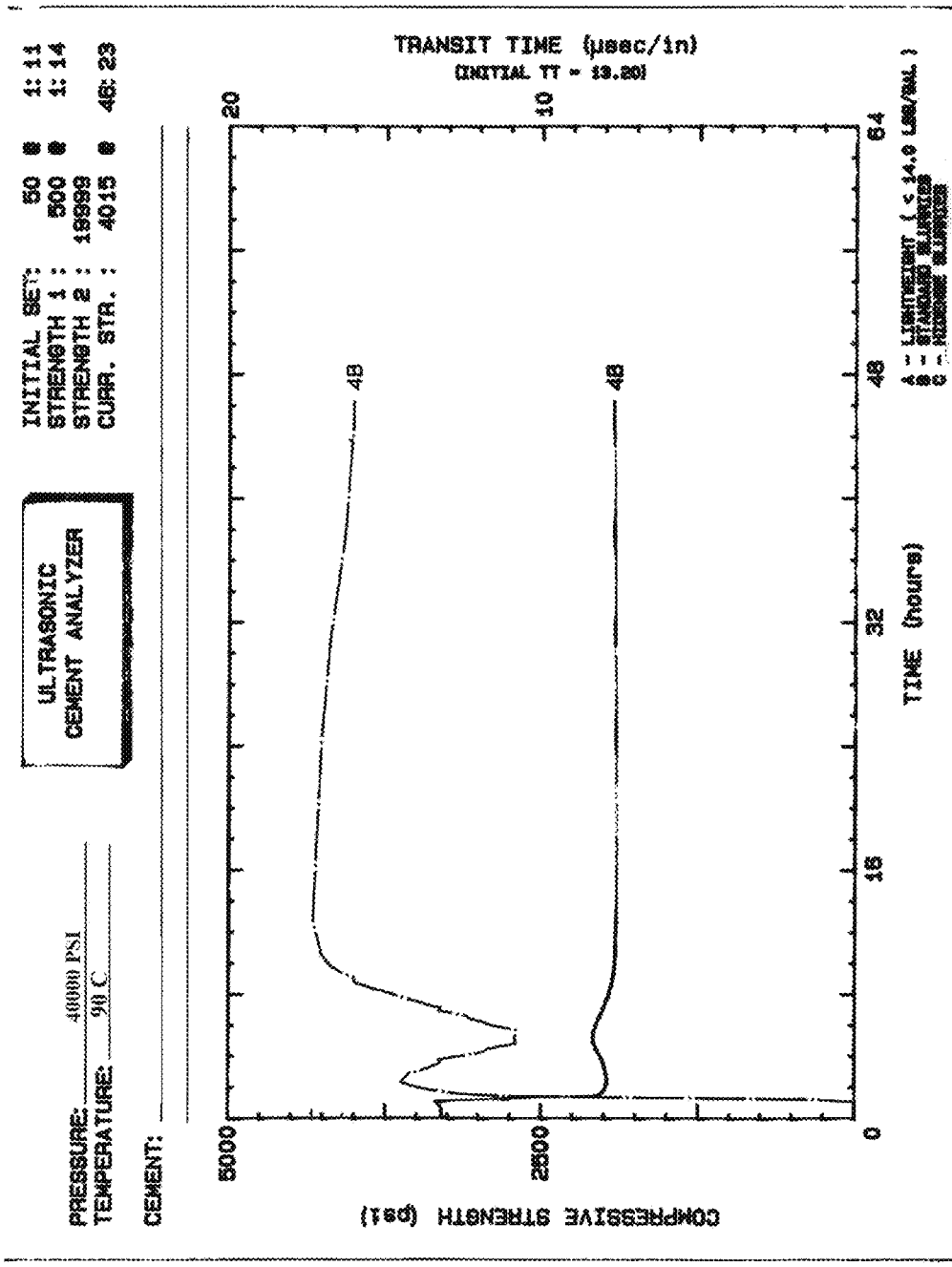
FIG. 10 is a graph showing compressive strength properties of the cement composition of Example 3.

The composition of Example 3 was hardened in the consistometer with a 25 minute ramp to 90° C. FIG. 10 illustrates the compressive strength of the magnesium oxysulfate cement composition of Example 3. The compressive strength was determined using an ultrasonic cement analyzer. The cement composition had a compressive strength of about 4000 psi just 2 hours after the transition from flowable slurry to solid state which is an excellent compressive strength.

The solid state cement composition of Examples 1-3 would be suitable for use in controlling wellbore fluid and gas movement, for example as a plug between inner and outer casings or for use in a squeeze operation.

Examples 4-6

Examples 4-6 demonstrate that magnesium oxysulfate cement composition embodiments with an operational range of about 40° C. to about 70° C. undergo a predictable transition from a flowable state to a solid state with a near-immediate transition from the flowable state to the solid state (i.e., a right-angle set). The transition occurs when the cement composition reaches an internal temperature of about 60-62° C.

Examples 4-6 were prepared according to the formulation of Table 3:

TABLE 3

| | Constituent | Amount | Weight Percent |
|---|---|---|---|
| 1 | Fresh Water | 300 g | 22.2% |
| 2 | Magnesium chloride | 450 g | 33.3% |
| 3 | Magnesium oxide Baymag 40 MgO | 300 g | 22.2% |
| 4 | Magnesium oxysulfate trihydrate | 300 g | 22.2% |
| | Total | 1350 g | 100% |

As indicated in Table 4, five batches of the composition of Example 4 were prepared and tested. One batch of each of the compositions of Examples 5-6 was prepared and tested. Observations were made regarding the time required for each batch of Example 4 to undergo the transition from the flowable state to the solid state as indicated in Table 4. This is the set time in Table 4. The magnesium oxysulfate cement compositions of Examples 4-6 were prepared in the same mixing order and manner as described in connection with Examples 1-3.

Figure 11:
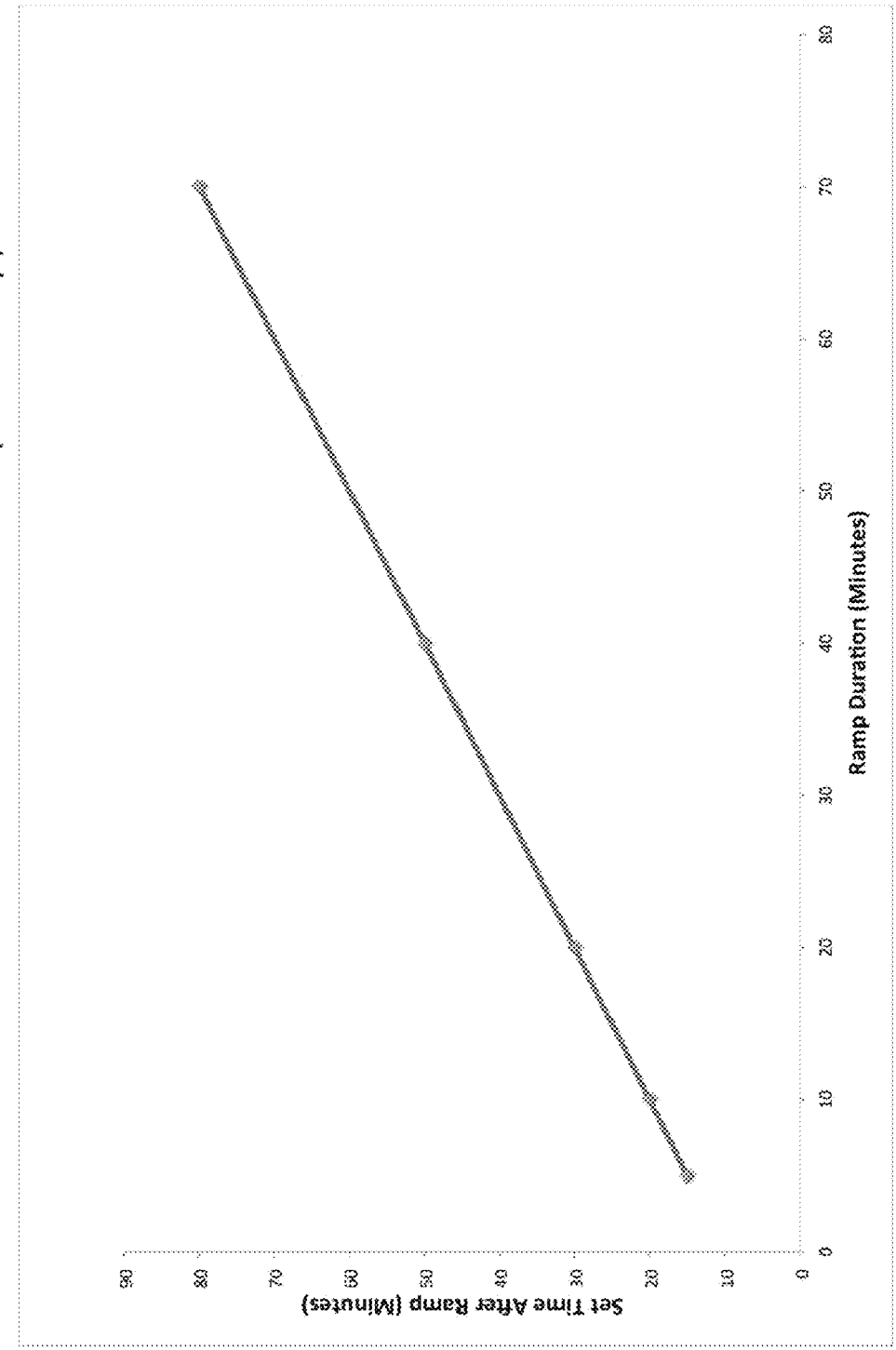
FIG. 11 is a graph showing setting properties of cement compositions according to Example 4.

Table 4 and FIG. 11 illustrate the times at which the cement composition embodiments of Example 4 transitioned from flowable slurry to a solid state. For each sample illustrated in Table 4 and FIG. 11, the consistometer was set to increase the consistometer temperature to 60° C. The ramp time for each batch is provided in FIG. 11. As illustrated in Table 4 and FIG. 11, each exemplary magnesium oxysulfate cement composition had a predictable and near-linear relationship between the time to transition from flowable slurry to the solid state and the cement composition temperature at which the transition occurs. As with Examples 3-6, the faster the cement composition temperature approaches the environmental or ambient temperature, the more rapidly the cement composition undergoes the transition from the flowable state to the solid state. The cement composition temperature at which the cement composition of Example 4 made the transition from flowable slurry to solid state was observed to be about 60° C. The linearity of the time for the cement compositions to set enables the user to predict when the cement composition will harden providing sufficient time to deliver the cement composition to the location where the cement composition is to be placed.

TABLE 4

| | Example 4 | |
|---|---|---|
| Batch | Ramp (Min) | Set Time (Minutes) |
| 1 | 5 | 14 |
| 2 | 10 | 20 |
| 3 | 20 | 30 |
| 4 | 40 | 50 |
| 5 | 70 | 80 |

Figure 12:
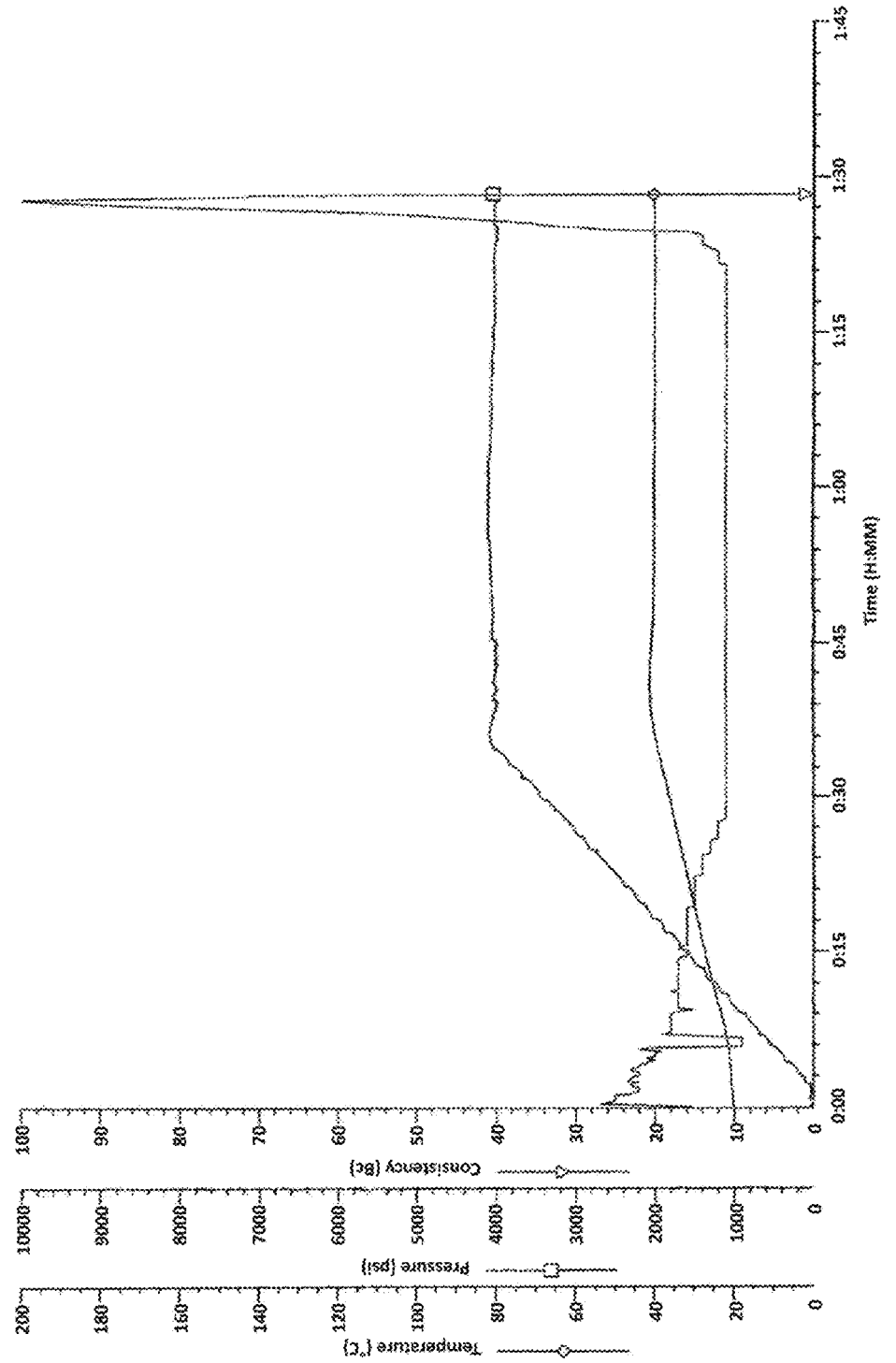
FIG. 12 is a graph showing setting properties of the cement composition of Example 5.

FIG. 12 is a graphical representation of the set characteristics of Example 5 in which the composition had a 39 minute ramp to a temperature of about 40° C. FIG. 12 demonstrates that the transition from flowable state to solid state is sudden and near-immediate occurring in less than 180 seconds. The shape of the curve in FIG. 12 is indicative of the right-angle set characteristic of compositions of the invention. The near-immediate transition from flowable state to solid state has little or no gel strength before the transition. The lack of gel strength avoids formation of channels and voids in the cement composition which could allow fluids and gas to pass through the cement composition even after the cement composition had hardened.

Figure 13:
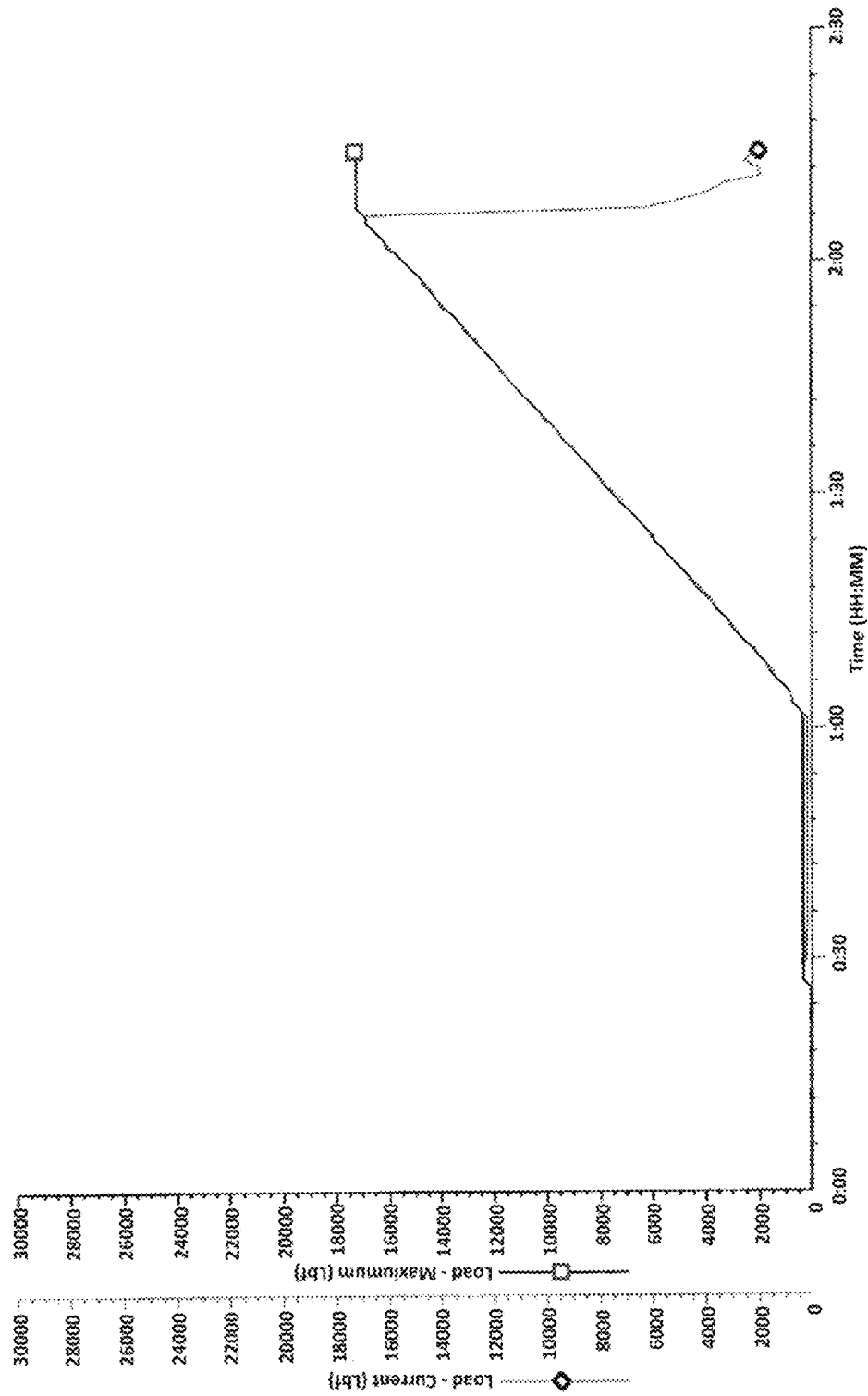
FIG. 13 is a graph showing compressive strength properties of the cement composition of Example 6.

FIG. 13 illustrates the compressive strength of the magnesium oxysulfate cement composition of Example 6. The composition was not evaluated in a consitometer but, rather, was allowed to set at about 3° C. environmental temperature. 24 hours after setting, the composition compressive strength was determined using a hydraulic crush tester. The cement composition had a compressive strength of about 4,000 psi before failure which is an excellent compressive strength.

Examples 7-8

Examples 7-8 demonstrate that an inhibitor can be added to magnesium oxysulfate cement composition embodiments with an operational range of about 70° C. to about 130° C. to predictably delay the transition from flowable state to solid state. Embodiments as illustrated in Examples 7-8 continue to have a right-angle set and make the transition when the cement composition reaches an internal temperature of about 72° C. An inhibitor is desirable when additional time is wanted to place the cement composition at a given location in the wellbore.

Examples 7-8 were prepared according to the formulation of Table 5:

TABLE 5

| | Constituent | Amount | Weight Percent |
|---|---|---|---|
| 1 | Fresh Water | 300 g | 22.17% to 21.98% |
| 2 | Magnesium chloride | 450 g | 33.26% to 32.97% |
| 3 | Magnesium oxide Magchem 10 MgO | 300 g | 22.17% to 21.98% |
| 4 | Magnesium oxysulfate trihydrate | 300 g | 22.17% to 21.98% |
| 5 | Inhibitor (1-5% by wt of MgO) Sodium tetraborate salt | 3 g to 15 g | 1% to 5% |
| | Total | 1353 g to 1365 g | 100% |

The exemplary magnesium oxysulfate cement compositions of Examples 7-8 were prepared by admixing from 3 g to 15 g (from 1-5% by wt of the magnesium oxide) of sodium tetraborate salt inhibitor with the 300 g of water and agitating for 5 minutes. Next, 450 g of magnesium chloride ($MgCl_2 \cdot 6H_2O$) was added to the admixture followed by agitation for approximately 2 minutes and the salt was observed to be in solution.

Next, 300 g of Magchem 10 magnesium oxide and 300 g of magnesium oxysulfate powder were admixed with the brine and inhibitor for approximately 5 minutes to form the base formulation slurry. The magnesium chloride salt brine and magnesium oxide powder reacted forming a magnesium oxysulfate cement slurry including inhibitor. The slurry was observed to be flowable with a fluid density of about 13.5 ppg (1.68 SG).

Figure 14:
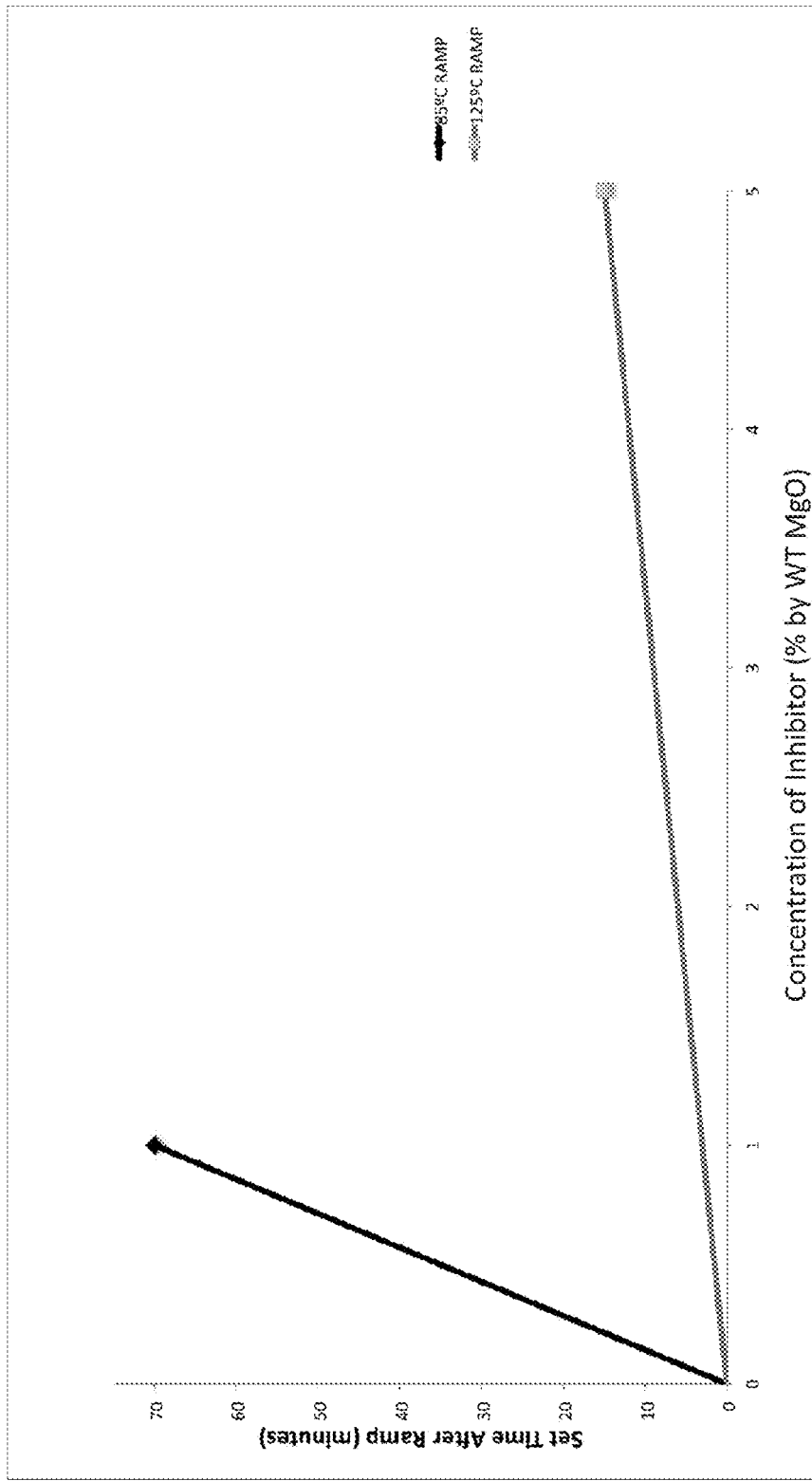
FIG. 14 is a graph showing setting properties of cement compositions according to Example 7.

Six batches of the composition of Example 7 were prepared and FIG. 14 graphically illustrates the set characteristics of those batches. The compositions included from 1% to 5% by weight sodium tetraborate salt inhibitor all based on the weight of magnesium oxide. One batch was evaluated with a ramp of 85° C. for 35 minutes with 1% inhibitor. Five batches were evaluated with a ramp of 125° C. for 35 minutes with from 1% to about 5% inhibitor. FIG. 14 illustrates that the transition from flowable state to solid state is predictable. As illustrated in FIG. 14, each exemplary magnesium oxysulfate cement composition had a predictable near-linear relationship between the time to transition from flowable slurry to the solid state and the cement composition temperature at which the transition occurs. The cement composition temperature at which the cement composition of Example 7 made the transition from flowable slurry to solid state was observed to be about 72° C. The linearity of the time for the cement compositions to set enables the user to predict when the cement composition will harden providing sufficient time to pump and displace the cement composition in the wellbore to the desired location.

Figure 15:
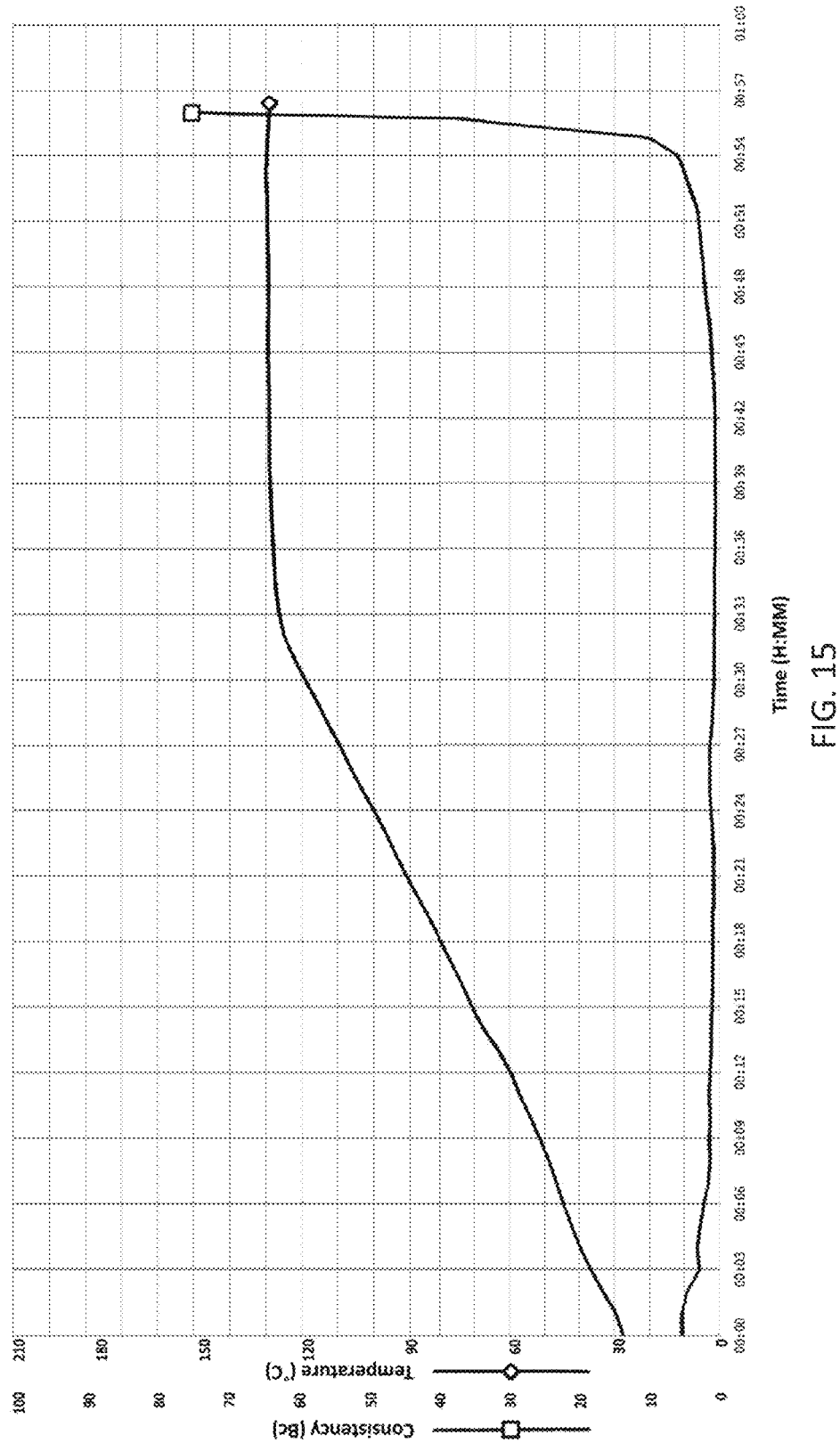
FIG. 15 is a graph showing setting properties of the cement composition of Example 8.

FIG. 15 is a graphical representation of the set characteristics of Example 8 including 5% by weight sodium borate salt inhibitor (based on the weight of magnesium oxide) with a 40 minute ramp to 125° C. The inhibitor is useful to control the transition which would occur much earlier in time than as indicated on FIG. 15 because of the 125° C. temperature. FIG. 15 demonstrates that the transition from the flowable state to the solid state is sudden and near-immediate occurring in less than 180 seconds. The shape of the curve in FIG. 15 is indicative of the right-angle set characteristic of compositions of the invention. The near-immediate transition from flowable state to solid state has little or no gel strength before the transition. The lack of gel strength avoids formation of channels and voids in the cement composition which could allow fluids and gas to pass through the cement composition even after the cement composition had hardened.

Examples 9-10

Examples 9-10 demonstrate that an inhibitor can be added to magnesium oxysulfate cement composition embodiments with an operational range of about 40° C. to about 60° C. to predictably delay the transition from flowable state to solid state. Embodiments as illustrated in Examples 9-10 continue to have a right-angle set and make the transition when the cement composition reaches an internal temperature of about 60° C. An inhibitor is desirable when additional time is wanted to place the cement composition at a given location in the wellbore.

Examples 9-10 were prepared according to the formulation of Table 6:

TABLE 6

| | Constituent | Amount | Weight Percent |
|---|---|---|---|
| 1 | Fresh Water | 300 g | 24.97% to 24.77% |
| 2 | Magnesium chloride | 450 g | 37.46% to 37.15% |
| 3 | Magnesium oxide Baymag 40 MgO | 225 g | 18.73% to 18.56% |
| 4 | Magnesium oxysulfate trihydrate | 225 g | 18.73% to 18.56% |
| 5 | Inhibitor (1-4% by wt of MgO) Borate salt | 2.25 g to 9 g | 1% to 4% |
| | Total | 1302.25 g to 1309 g | 100% |

Figure 16:
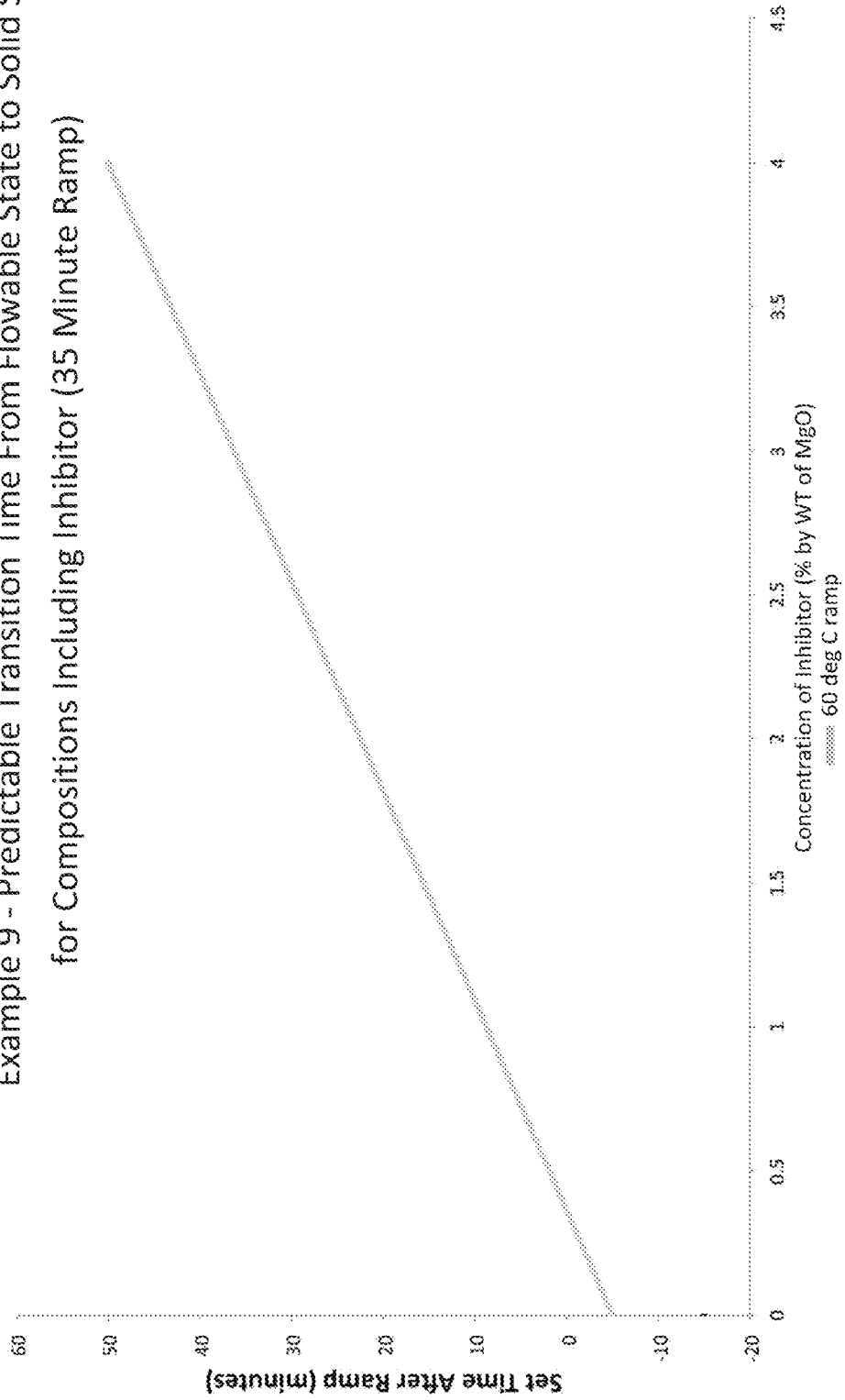
FIG. 16 is a graph showing setting properties of cement compositions according to Example 9.

The magnesium oxysulfate cement compositions of Examples 9-10 were prepared in the same mixing order and manner as described in connection with Examples 7-8 except that Baymag 40 was utilized as a magnesium oxide constituent. Four batches of the composition of Example 9 were prepared and FIG. 16 graphically illustrates the set characteristics of those batches. The four batches were evaluated with a ramp of 60° C. for 35 minutes and from 2.25 g to 9 g inhibitor (from 1-4% weight of the magnesium oxide). FIG. 16 illustrates that the transition from flowable state to solid state is predictable. As illustrated in FIG. 16, each exemplary magnesium oxysulfate cement composition had a predictable near-linear relationship between the time to transition from flowable slurry to the solid state and the cement composition temperature at which the transition occurs. The cement composition temperature at which the cement composition of Example 9 made the transition from flowable slurry to solid state was observed to be about 60° C. The linearity of the time for the cement compositions to set enables the user to predict when the cement composition will harden providing sufficient time to deliver the cement composition to the location where the cement composition is to be delivered.

Figure 17:
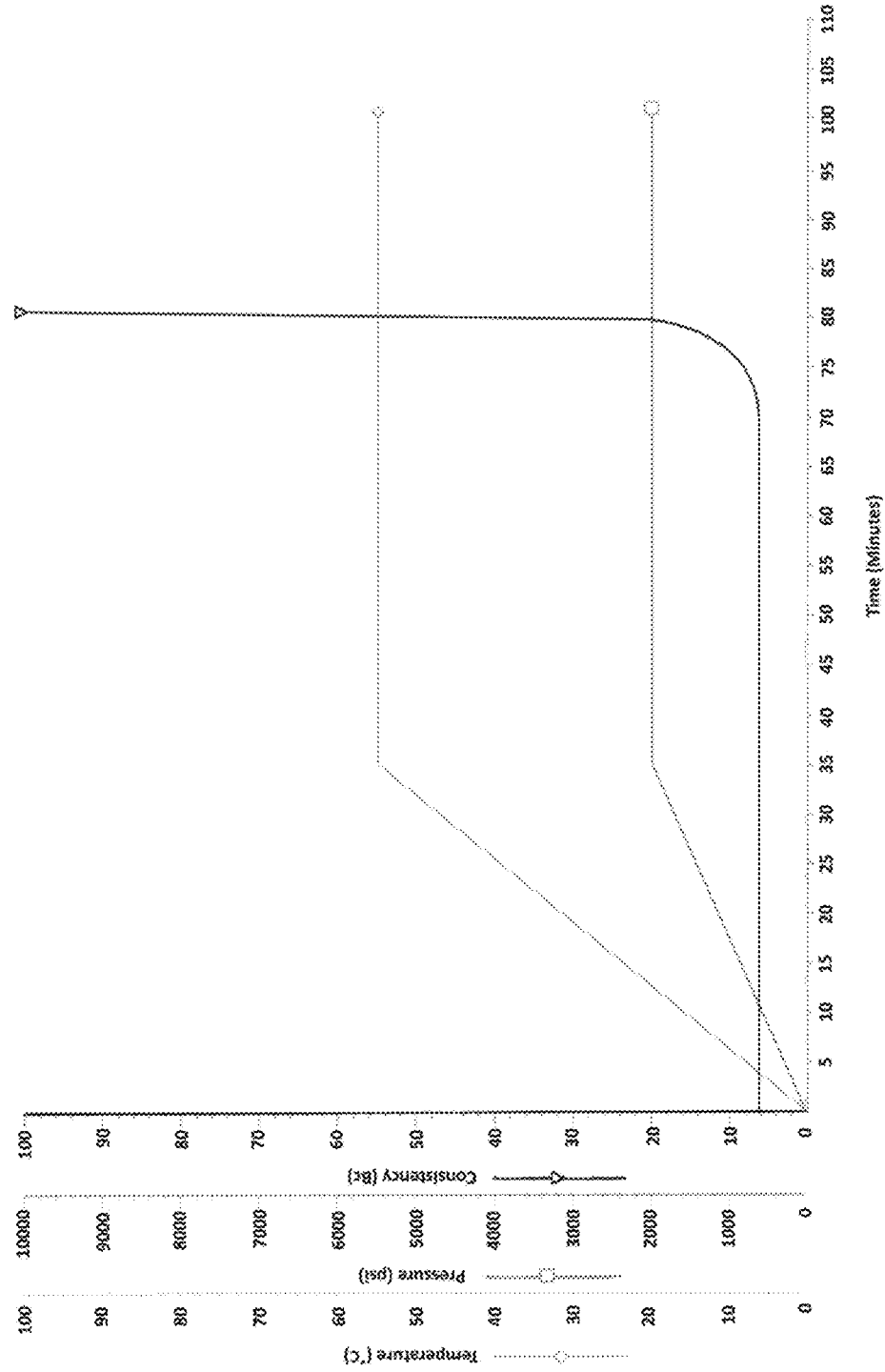
FIG. 17 is a graph showing setting properties of the cement composition of Example 10.

FIG. 17 is a graphical representation of the set characteristics of Example 10 including 2% by weight sodium borate salt inhibitor (based on the wt. magnesium oxide) evaluated using a 35 minute ramp to 55° C. FIG. 17 demonstrates that the transition from flowable state to solid state is sudden and near-immediate occurring in less than 180 seconds. The shape of the curve in FIG. 17 is indicative of the right-angle set characteristic of compositions of the invention. The near-immediate transition from flowable state to solid state has little or no gel strength before the transition. The lack of gel strength avoids formation of channels and voids in the cement composition which could allow fluids and gas to pass through the cement composition.

Example 11

Example 11 demonstrates that an accelerator can be added to magnesium oxysulfate cement composition embodiments with an operational range of about 40° C. to about 60° C. to predictably shorten or accelerate the transition from flowable state to solid state. Embodiments as illustrated in Example 11 continue to have a right-angle set and make the transition when the cement composition reaches an internal temperature of about 60° C. An accelerator is desirable when it is necessary for the cement composition to set or harden in less time than an unmodified embodiment of the cement composition or when using magnesium oxysulfate cement composition embodiments in cold environmental temperatures.

TABLE 7

| | Constituent | Amount | Weight Percent |
|---|---|---|---|
| 1 | Fresh Water | 300 g | 22.2% to 18.5% |
| 2 | Magnesium chloride | 450 g | 33.3% to 27.8% |
| 3 | Magnesium oxide Baymag 40 MgO | 300 g | 22.2% to 18.5% |
| 4 | Magnesium oxysulfate trihydrate | 300 g | 22.2% to 18.5% |
| 5 | Accelerator Anhydrous magnesium sulfate | 0 g to 270 g | 0% to 20% |
| | Total | 1350 g to 1620 g | 100% |

Figure 18:
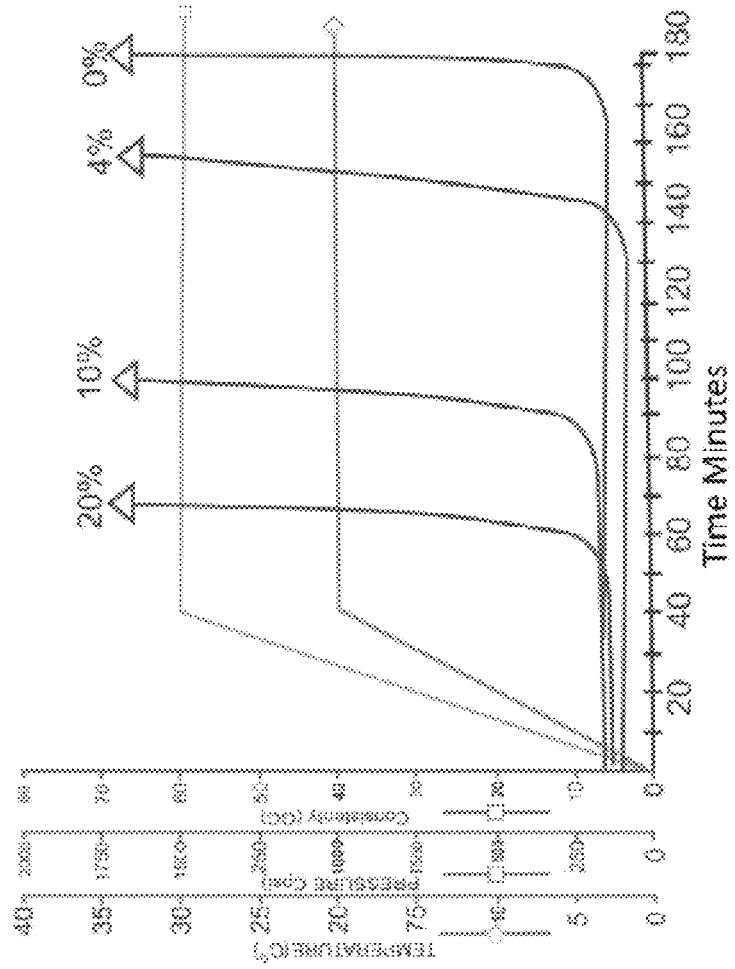
FIG. 18 is a graph showing setting properties of cement compositions according to Example 11.

FIG. 18 presents the results from Example 11. The examples were evaluated with a 40 minute ramp to 20° C. FIG. 18 illustrates that the characteristic right-angle set is present with the magnesium oxysulfate compositions having ranges of accelerator of from 0% to 20%. The accelerator is effective to permit setting at a temperature lower than the operational range of the unmodified cement compositions while also decreasing the time within which the magnesium oxysulfate compositions make the transition from flowable state to solid state.

Examples 12 and 13

Examples 12 and 13 demonstrate that magnesium oxysulfate cement compositions can be formulated with fresh water as an alternative to brine or sea water. Examples 12 and 13 were prepared according to the formulations in Table 8.

TABLE 8

| | | Example 12 | | Example 13 | |
|---|---|---|---|---|---|
| No | Constituent | Amount | Weight Percent | Amount | Weight Percent |
| 1 | Fresh Water | 300 g | 25% | 450 g | 24.5% |
| 2 | Magnesium oxide Baymag 40 | 450 g | 37.5% | 690 g | 37.7% |
| 3 | Magnesium oxysulfate trihydrate | 450 g | 37.5% | 690 g | 37.7% |
| | Total | 1200 g | 100% | 1830 g | 100% |

Examples 12 and 13 were tested on a consistometer in the same manner as described in connection with Examples 1-3 but with a 40 minute ramp to 45° C. Examples 12 and 13 had the characteristic right-angle sets and illustrate that fresh water can be used to formulate magnesium oxysulfate cement compositions.

Example 14

A magnesium oxysulfate cement composition embodiment was evaluated with respect to formation of a plug between inner and outer casings to prevent fluid and gas flow through the wellbore space defined by the inner and outer casings. For purposes of the experiment, a vertically-oriented outer casing with an inner casing of the types used in oil and gas wells was provided. The outer casing was of the type suitable for use as a surface casing. The outer casing was made of 30 inch diameter steel pipe having an axial length of 8 meters and an inside diameter of 28.5 inches. The inner casing was made of 24 inch steel pipe having an axial length of 8 meters and an inside diameter of 23 inches. The inner casing was centered within the outer casing by a centralizer such that the outer and inner casings were concentric about a single center. A wellbore space, or annulus, was defined between the outer and inner casings.

An exemplary magnesium oxysulfate cement composition slurry was prepared. The magnesium oxysulfate cement composition of Example 14 included the constituents and constituent amounts listed in Table 9.

TABLE 9

| | Constituent | Amount | Weight Percent |
|---|---|---|---|
| 1 | Fresh Water | 408 kg (408 L) | 22.2% |
| 2 | Magnesium chloride | 612 kg | 33.3% |
| 3 | Magnesium oxide Baymag 40 | 220 kg | 11.97% |
| 4 | Magnesium oxysulfate trihydrate | 220 kg | 11.97% |
| 5 | Salt tolerant viscosifier Hydroxyethylcellulose | 6.8 kg | 0.37% |
| 6 | Silica beads | 353.68 kg | 19.24% |
| 7 | Inhibitor - Borate salt (Based on MgO) | 12.24 kg | 5.6% |
| 8 | Anhydrous magnesium sulfate | 5.4 kg | 0.29% |
| | Total | 1838.12 kg | 100% |

A batch of magnesium oxysulfate cement composition slurry was prepared in a 10 m³ Baker mix tank according to the following mixing order to yield 1 m³ of flowable slurry. First, a brine was formulated. 408 liters of fresh water was added to the tank. Next, 12.24 kgs of a sodium tetra borate salt inhibitor was admixed with the water using mechanical paddles for 5 minutes until dissolved in the water. A brine was next formulated by addition of 612 kgs of magnesium chloride salt. The magnesium chloride salt was admixed with the water and inhibitor using the mechanical paddles for 3 minutes until dissolved in the water to complete the brine formulation.

Next, 220 kgs of magnesium oxide and 220 kgs of magnesium oxysulfate trihydrate was admixed with the brine/inhibitor admixture by means of the mechanical paddles. Next, 6.8 kgs of hydroxyethylcellulose salt tolerant viscosifier was added to match the viscosity of the annular drilling fluid. To modify the specific gravity of the composition, 353.68 kgs of hollow silica beads were added. The silica beads had the effect of reducing the specific gravity because of their relatively low density. 5.4 kgs of an anhydrous magnesium sulfate accelerator was also added to the batch. Example 14 demonstrates that it is possible to engineer and modify the time within which the magnesium oxysulfate cement composition makes the transition from flowable to solid state by including both inhibitor and accelerator in the same composition. There was no need to shear and the slurry composition mixed easily.

Once all constituents were in the mix tank, the slurry composition was mixed for a total of 10 minutes to provide a homogenous slurry in a flowable state. The temperature of the fresh water was 10° C. The environmental (i.e., ambient) outside temperature was 3° C. The specific gravity (SG) of the magnesium oxysulfate cement composition slurry was determined to be 1.45.

The annulus space between the outer casing and the inner casing was filled with a water-based polymer drilling fluid having an SG of 1.45. The drilling fluid was of the same type used in wellbore operations to control fluid and gas flow. The magnesium oxysulfate cement slurry composition was engineered to have an SG approximately the same as the SG of the drilling fluid to test the theory that the cement slurry composition could be made to flow generally laterally and radially within the outer casing with minimal axial flow along the outer casing axis to displace the drilling fluid and form a plug between the outer and inner casings.

The flowable magnesium oxysulfate cement composition slurry composition was then pumped through a 1 inch inside diameter (ID) steel pipe supply line, with a 1 inch ID inch 90 degree "T-shaped" end portion, or elbow, having two outlets along a single outlet axis at opposed ends of the elbow. FIG. 3A schematically illustrates a supply line 53 with a T-shaped elbow-like end portion 57 of the type used in Example 14. The supply line was inserted down and within the wellbore space (i.e., the annulus) between the outer and inner casings so that the end of the supply line and 90 degree T-shaped end portion was 2.5 meters below the upper ends of the outer and inner casings and the outlets of the T-shaped end portion were in an imaginary horizontal plane within the wellbore space between the outer and inner casings.

The flowable magnesium oxysulfate cement composition slurry was pumped/displaced into the wellbore space using a centrifugal pump in approximately 10 minutes.

The test operation was left for 24 hours to enable the magnesium oxysulfate cement slurry composition to transition from the flowable state to a solid state. Compressive strength after 24 hours was determined to be 4000 psi which is an excellent compressive strength for a 24 hour period after placement in the wellbore space. After 24 hours, steel rods were inserted down through the upper end of the outer casing and into the wellbore space to "tag" the uppermost surface of the then-hardened solid state magnesium oxysulfate cement composition. The casings were then lowered from the vertical orientation to a horizontal orientation so that the casings were resting on the ground surface. An air cutting tool was then used to cut openings in the outer casing to visually observe the integrity and placement of magnesium oxysulfate cement composition.

Visual observation of the hardened solid-state magnesium oxysulfate cement composition viewable through the openings confirmed that the magnesium oxysulfate cement slurry composition had flowed bi-directionally and laterally in both clockwise and counterclockwise directions from the outlets of the T-shaped end portion of the supply line around the wellbore space. The magnesium oxysulfate cement slurry composition had completely filled an axial region of the wellbore space between the inner and outer casings with minimal axial flow. The solid-state cement composition formed a hardened plug between the casings. The hardened plug had a generally annular or ring shape which would prevent fluid and gas flow through the wellbore. The magnesium oxysulfate cement composition had bonded to both the outer casing and the surface of the inner casing effectively sealing and closing the wellbore space against fluid and gas flow.

It should be understood that magnesium oxysulfate cement compositions may be used in any drilling operation wherein control over underground substances, such as fluids, gases and particulates, is desired. Compositions of the types described herein may also be used in applications in addition to those involving the sealing of wellbores.

\* \* \*

While the principles of this invention have been described in connection with specific embodiments, it should be understood clearly that these descriptions are made only by way of example and are not intended to limit the scope of the invention.

The invention claimed is:

1. A method for preventing fluid and gas flow through a wellbore space around an axis and defined by an inner casing and an outer casing which surrounds the inner casing, the method comprising the steps of:
   preparing a cement slurry to be injected into the wellbore space;
   placing a cement slurry supply line into the wellbore space between the casings, the supply line having at least two lateral outlets providing at least bi-directional flow of the cement slurry away from the supply line; and
   injecting the cement slurry into the wellbore through the supply line and the at least two lateral outlets such that the cement slurry simultaneously flows at least bi-directionally in both clockwise and counterclockwise directions around the wellbore space generally orthogonal to the axis with minimal axial flow to completely fill an axial region of the wellbore space thereby forming a solid plug between the casings which prevents fluid and gas flow through the wellbore, the cement slurry rapidly transitioning from a flowable state to a solid state to form the plug with formation of little or no gel strength before the transition and having a near-linear relationship between the time required for the transition to occur and the composition temperature at which the transition occurs.

2. The method of claim 1 further comprising the steps of:
   determining the specific gravity of a fluid filling the wellbore space; and setting the specific gravity of the cement slurry to be approximately the same as that of the fluid.

3. The method of claim 2 wherein the setting step further comprises:
determining the specific gravity of the cement slurry; and
adjusting the specific gravity of the cement slurry.

4. The method of claim 2 wherein the method further comprises the steps of:
determining the viscosity of the fluid filling the wellbore space;
setting the viscosity of the cement slurry to be greater than or approximately the same as that of the fluid.

5. The method of claim 2 wherein the cement slurry comprises an admixture of:
about 33% to about 38% by weight magnesium oxide;
about 22% to about 38% by weight magnesium sulfate trihydrate; and
about 15% to about 25% by weight water.

6. The method of claim 3 wherein the adjusting step further comprises adjusting the specific gravity of the cement slurry with at least one weight modifier selected from the group consisting of silica beads, barite, galena and mixtures thereof.

7. The method of claim 5 wherein the water is admixed with about 22% to about 24% by weight of magnesium chloride hexahydrate to yield a brine and the magnesium oxide and magnesium sulfate trihydrate are admixed with the brine.

8. The method of claim 5 wherein the magnesium oxide is calcined at a temperature of up to about 1200° C.

9. The method of claim 5 wherein the magnesium oxide is calcined at a temperature of up to about 800° C.

10. The method of claim 5 further including about 0.001% to about 20% by weight of an anhydrous magnesium sulfate accelerator.

11. The method of claim 5 further including about 0.001% to about 5% by weight of the magnesium oxide of a borate salt inhibitor.

12. The method of claim 5 further including about 1% to about 5% by weight of hydroxyethylcellulose.

13. The method of claim 5 wherein the wellbore includes a centralizer in the wellbore space between the casings and the method further comprises injecting the cement into the wellbore space between the centralizer and a well surface opening.

14. The method of claim 7 wherein the brine comprises a ratio of about 1.33 kg magnesium chloride hexahydrate to about 1 L water.

15. The method of claim 11 wherein the borate salt inhibitor is selected from the group consisting of sodium tetraborate decahydrate and sodium hexametaphosphate.

16. The method of claim 13 wherein the centralizer supports the inner casing within the outer casing and the method further comprises the steps of:
identifying a source of the fluid and gas flow through the wellbore space; and
the placing step further comprises the step of placing the supply line into the wellbore space with the at least two lateral outlets between the centralizer and the well surface opening with the centralizer between the source and the at least two lateral outlets.

17. The method of claim 16 wherein the supply line comprises:
a tube having an end; and
at least two lateral outlets proximate the end.

18. The method of claim 17 wherein the lateral outlets face in opposite directions.

19. The method of claim 18 wherein the tube is selected from the group consisting of an axial tube and a coiled tube.

* * * * *